(12) United States Patent
Risinger et al.

(10) Patent No.: US 10,679,315 B2
(45) Date of Patent: Jun. 9, 2020

(54) DETECTED OBJECT TRACKER FOR A VIDEO ANALYTICS SYSTEM

(71) Applicant: Intellective Ai, Inc., Dallas, TX (US)

(72) Inventors: Lon W. Risinger, Katy, TX (US); Kishor Adinath Saitwal, Pearland, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

(21) Appl. No.: 15/934,328

(22) Filed: Mar. 23, 2018

(65) Prior Publication Data

US 2019/0012761 A1    Jan. 10, 2019

Related U.S. Application Data

(63) Continuation of application No. PCT/US2016/053478, filed on Sep. 23, 2016, which is a continuation of application No. 14/863,344, filed on Sep. 23, 2015, now abandoned, and a continuation of application No. 14/863,311, filed on Sep. 23, 2015, now abandoned, and a continuation of application
(Continued)

(51) Int. Cl.
*G06K 9/00* (2006.01)
*G06T 1/20* (2006.01)
*G06T 7/254* (2017.01)

(52) U.S. Cl.
CPC ............ *G06T 1/20* (2013.01); *G06K 9/00785* (2013.01); *G06T 7/254* (2017.01); *G06T 2207/10016* (2013.01); *G06T 2207/10024* (2013.01); *G06T 2207/30236* (2013.01); *G06T 2207/30241* (2013.01)

(58) Field of Classification Search
CPC . G06T 2207/10016; G06T 2207/30241; G06T 7/194; G06T 2207/10024; G06T 2210/12; G06K 9/6202; G06F 16/70
See application file for complete search history.

(56) References Cited

U.S. PATENT DOCUMENTS 6,643,387 B1    11/2003  Sethuraman et al.
7,136,525 B1 *  11/2006  Toyama ............... G06K 9/38
                                              382/173
(Continued)

OTHER PUBLICATIONS

Office Action for U.S. Appl. No. 14/863,267, dated Feb. 24, 2017, 35 pages.
Office Action for U.S. Appl. No. 14/863,267, dated Nov. 2, 2017, 29 pages.
(Continued)

*Primary Examiner* — Guillermo M Rivera-Martinez

(57) ABSTRACT

Techniques are disclosed which provide a detected object tracker for a video analytics system. As disclosed, the detected object tracker provides a robust foreground object tracking component for a video analytics system which allow other components of the video analytics system to more accurately evaluate the behavior of a given object (as well as to learn to identify different instances or occurrences of the same object) over time. More generally, techniques are disclosed for identifying what pixels of successive video frames depict the same foreground object. Logic implementing certain functions of the detected object tracker can be executed on either a conventional processor (e.g., a CPU) or a hardware acceleration processing device (e.g., a GPU), allowing multiple camera feeds to be evaluated in parallel.

20 Claims, 10 Drawing Sheets

Related U.S. Application Data

No. 14/863,295, filed on Sep. 23, 2015, now abandoned, and a continuation of application No. 14/863,267, filed on Sep. 23, 2015, now abandoned.

(56) References Cited

U.S. PATENT DOCUMENTS

| | | | |
|---|---|---|---|
| 2005/0271273 A1* | 12/2005 | Blake | G06K 9/00624 |
| | | | 382/173 |
| 2006/0291696 A1 | 12/2006 | Shao et al. | |
| 2007/0036432 A1* | 2/2007 | Xu | G06K 9/344 |
| | | | 382/173 |
| 2008/0118106 A1 | 5/2008 | Kilambi et al. | |
| 2008/0166045 A1* | 7/2008 | Xu | G06K 9/00771 |
| | | | 382/170 |
| 2008/0193010 A1* | 8/2008 | Eaton | G06K 9/00771 |
| | | | 382/159 |
| 2009/0087085 A1* | 4/2009 | Eaton | G06F 15/16 |
| | | | 382/159 |
| 2009/0167843 A1 | 7/2009 | Izzat et al. | |
| 2009/0296989 A1 | 12/2009 | Ramesh et al. | |
| 2009/0297023 A1* | 12/2009 | Lipton | G06K 9/00771 |
| | | | 382/164 |
| 2010/0092030 A1* | 4/2010 | Golan | G06K 9/00362 |
| | | | 382/103 |
| 2010/0177194 A1 | 7/2010 | Huang et al. | |
| 2011/0052000 A1* | 3/2011 | Cobb | G06K 9/00335 |
| | | | 382/103 |
| 2011/0185311 A1* | 7/2011 | King | G06F 21/36 |
| | | | 715/794 |
| 2011/0279475 A1 | 11/2011 | Ikenoue | |
| 2012/0148103 A1* | 6/2012 | Hampel | G06K 9/00771 |
| | | | 382/103 |
| 2013/0129205 A1* | 5/2013 | Wang | G06K 9/6278 |
| | | | 382/164 |
| 2013/0266187 A1 | 10/2013 | Bulan et al. | |
| 2013/0322763 A1 | 12/2013 | Heu et al. | |
| 2014/0132758 A1 | 5/2014 | Saptharishi et al. | |
| 2014/0146997 A1 | 5/2014 | Chang et al. | |
| 2014/0254863 A1 | 9/2014 | Marks et al. | |
| 2014/0321702 A1 | 10/2014 | Schmalstieg | |
| 2015/0131851 A1* | 5/2015 | Bernal | G06K 9/00711 |
| | | | 382/103 |
| 2015/0178568 A1 | 6/2015 | Shellshear | |
| 2017/0083764 A1 | 3/2017 | Risinger et al. | |
| 2017/0083765 A1 | 3/2017 | Risinger et al. | |
| 2017/0083766 A1 | 3/2017 | Risinger et al. | |
| 2017/0083790 A1 | 3/2017 | Risinger et al. | |

OTHER PUBLICATIONS

Office Action for U.S. Appl. No. 14/863,344, dated Apr. 21, 2017, 26 pages.
Office Action for U.S. Appl. No. 14/863,344, dated Feb. 8, 2018, 33 pages.
Office Action for U.S. Appl. No. 14/863,311, dated Jan. 27, 2017, 33 pages.
Office Action for U.S. Appl. No. 14/863,311, dated Nov. 2, 2017, 29 pages.
Office Action for U.S. Appl. No. 14/863,295, dated Dec. 30, 2016, 33 pages.
Office Action for U.S. Appl. No. 14/863,295, dated Oct. 31, 2017, 28 pages.
International Search Report and Written Opinion for International Application No. PCT/US2016/053478, dated Feb. 6, 2017, 19 pages.
Dhillon, P. S. et al., "Combining appearance and motion for human action classification in videos," Computer Vision and Pattern Recognition Workshops 2009, IEEE Computer Society Conference, 2009, pp. 22-29.
Egerstedt, M. et al., "What are the ants doing? Vision-based tracking and reconstruction of control programs," Proceedings of the 2005 IEEE, International Conference on Robotics and Automation, Barcelona, Spain, Apr. 2005, pp. 4182-4187.
Han, H. et al., "An evolutionary particle filter with the immune genetic algorithm for intelligent video target tracking," Computers and Mathematics with Applications vol. 62 No. 7 (2011), pp. 2685-2695.
Haritaoglu, I. et al., "W4: Real-time surveillance of people and their activities," IEEE Transactions on Pattern Analysis and Machine Intelligence, 22(8):809-830 (Aug. 2000).
Loza, A. et al., "Structural similarity-based object tracking in video sequences," Information Fusion, 2006 9th International Conference, IEEE, 2006.
Nummiaro, K. et al., "An adaptive color-based particle filter," Image and Vision Computing, 21(1):99-110 (2003).
Ortegon-Aguilar, J. et al., "Particle filter tracking without dynamics," Applied Bionics and Biomechanics, vol. 4, No. 4, pp. 169-177 (2007).
Papadourakis, V. et al., "Multiple objects tracking in the presence of long-term occlusions," Computer Vision and Image Understanding, vol. 114, No. 7 (2010), pp. 835-846.
Wu, P. et al., "Covariance tracking algorithm based on particle filter and adaptive template update," 2010 2nd International Conference on Education Technology and Computer (ICETC), pp. V3-199-V3-202, 2010 IEEE.

* cited by examiner

DETECTED OBJECT TRACKER FOR A VIDEO ANALYTICS SYSTEM

This application is a continuation of PCT/US2016/053478, filed Sep. 23, 2016, which in turn is claims priority to and benefit of U.S. application Ser. Nos. 14/863,267, 14/863,344, 14/863,311, and 14/863,295, each filed on Sep. 23, 2015; the entirety of each of the aforementioned applications is herein expressly incorporated by reference for all purposes.

FIELD

Embodiments of the disclosure generally relate to techniques for analyzing digital images. More specifically, embodiments presented herein provide a variety of techniques for effectively and efficiently tracking foreground objects depicted in a stream of video frames trained on a scene.

BACKGROUND

Video analytics generally refers to applications that evaluate images captured by a digital camera, and a variety of approaches have been developed to programmatically evaluate a video stream.

SUMMARY

One embodiment includes a computer-implemented method for tracking foreground objects depicted in a scene. This method may generally include receiving a background/foreground BG/FG segmentation of a current video frame. The current video frame includes one or more appearance values for each of a plurality of pixels and wherein the BG/FG segmentation classifies one or more of the pixels as depicting either scene foreground or scene background. For each region of pixels in the current frame classified as depicting scene foreground, an ellipse bounding the region is determined. This method may also include classifying at least a first one of the ellipses as corresponding to a first known foreground object tracked in at least a prior frame and extending a trajectory of the first known foreground object based on the appearance values of the pixels bound by the first ellipse.

Another embodiment includes a computer-readable storage medium containing a program, which when executed on a processor, performs an operation for tracking foreground objects depicted in a scene. This operation may generally include receiving a background/foreground BG/FG segmentation of a current video frame. The current video frame includes one or more appearance values for each of a plurality of pixels and wherein the BG/FG segmentation classifies one or more of the pixels as depicting either scene foreground or scene background. For each region of pixels in the current frame classified as depicting scene foreground, determining an ellipse binding the region is determined. This operation may further include classifying at least a first one of the ellipses as corresponding to a first known foreground object tracked in at least a prior frame and extending a trajectory of the first known foreground object based on the appearance values of the pixels bound by the first ellipse.

Still another embodiment includes a system having a video input source configured to provide a sequence of video frames, each depicting a scene, a central processing unit (CPU), and a memory containing a program, which, when executed on the CPU is configured to perform an operation for tracking foreground objects depicted in a scene. This operation may generally include receiving a background/foreground BG/FG segmentation of a current video frame. The current video frame includes one or more appearance values for each of a plurality of pixels and wherein the BG/FG segmentation classifies one or more of the pixels as depicting either scene foreground or scene background. For each region of pixels in the current frame classified as depicting scene foreground, determining an ellipse binding the region is determined. This operation may further include classifying at least a first one of the ellipses as corresponding to a first known foreground object tracked in at least a prior frame and extending a trajectory of the first known foreground object based on the appearance values of the pixels bound by the first ellipse.

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to the embodiments illustrated in the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
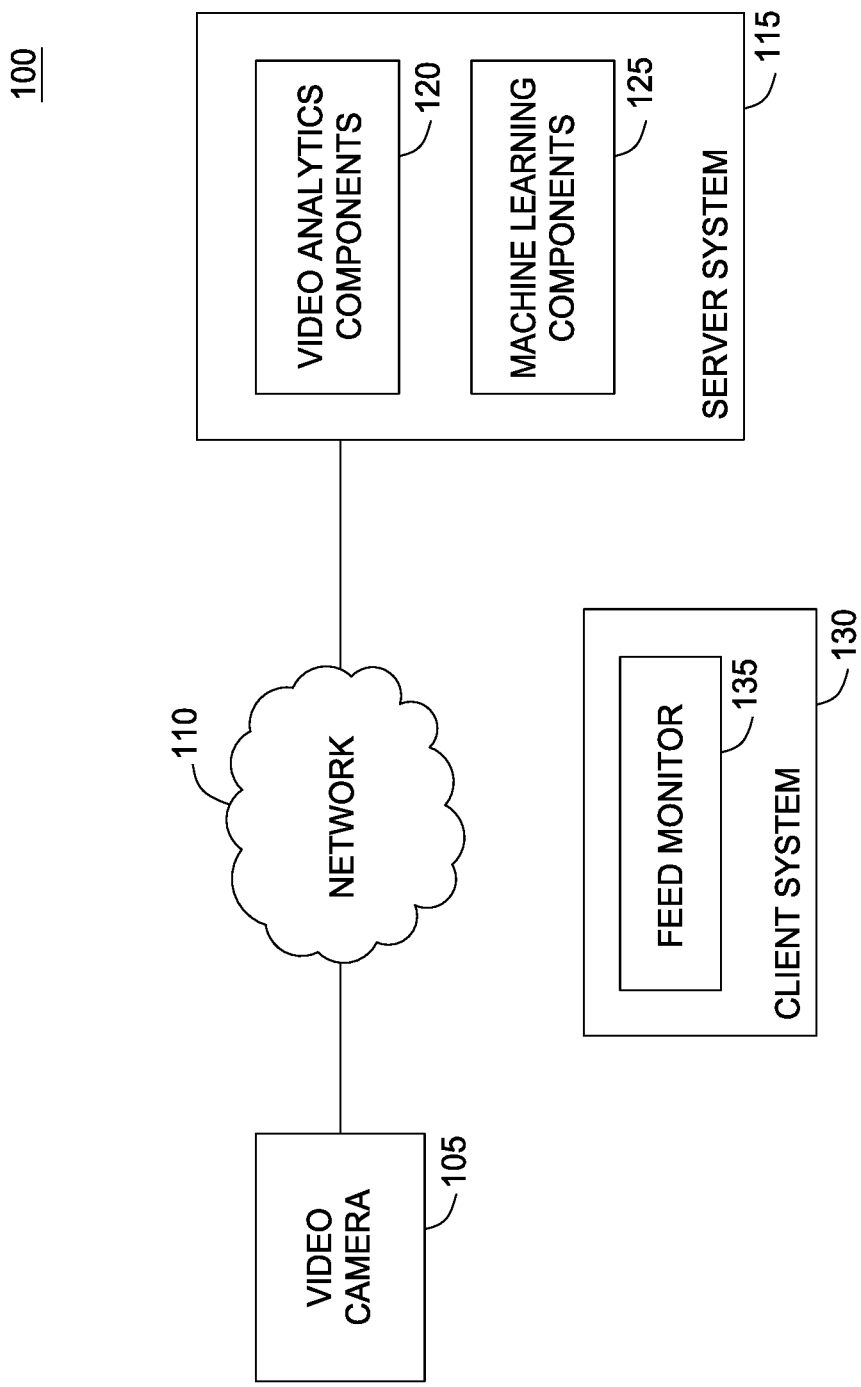
FIG. 1 illustrates components of a video analytics system, according to one embodiment of the disclosure.

Embodiments of the disclosure presented herein provide a robust foreground object tracking component for a video analytics system. The foreground object tracking component allows other components of a video analytics system to more accurately evaluate the behavior of a given foreground object (as well as to learn to identify distinct instances or occurrences of a foreground object) over time. More generally, embodiments of the disclosure provide techniques for tracking what pixels of successive video frames depict the same person, object or thing in the video without using any predefined knowledge about the objects which may be captured by a given camera.

Some video analytics systems may be configured to detect a set of pre-defined patterns in a video stream. To do so, many video analytics applications generate a background model as part of evaluating a video stream. A background model generally represents static elements of a scene within a field-of-view of a video camera. For example, consider a video camera trained on a stretch of roadway. In such a case, the background would include the roadway surface, the medians, any guard rails or other safety devices, and traffic control devices, etc., visible to the camera. The background model may include an expected (or predicted) pixel value (e.g., an RGB or gray scale value) for each pixel of the scene when the background is visible to the camera. The background model provides an image of the scene in which no activity is occurring (e.g., an empty roadway). Conversely, vehicles traveling on the roadway (and any other person or thing engaging in some activity) occlude the background when visible to the camera and represent scene foreground objects. Once an application constructs a background model, groups of pixels which depict a foreground object in each video frame can be identified. In some cases, it is useful to track a foreground object that appears in multiple frames. However, a variety of challenges arise in tracking a foreground objects across frames of a video streams based simply on changes in pixel values from frame-to-frame. As a simple example, pixels depicting a given foreground object can change as the object moves about the scene. Consider a car driving in across a frame. In such a case, the car may retain the same general shape, while pixels depicting the car change from frame-to-frame. As a more challenging example, the car could be moving toward a camera or turning, changing the perspective of the car relative to the camera. In other cases, the appearance and shape of the foreground object can radically change, even if relatively stationary (e.g., a person opening an umbrella in view of a camera). Further, foreground objects can interact with one another, resulting in foreground-foreground interactions and foreground-background interactions.

Further, to process a live camera feed, a foreground object depicted in a video stream often needs to be tracked at or near the same frame rate of a video analytics system. That is, a real-time video analytics system should be able to identify and evaluate a foreground object each frame (or every N frames) while processing a live video feed. One approach to tracking foreground objects is to create a complex object model for each foreground object detected by the video analytics system—e.g., a multi-state appearance model. However, doing so results in a tracking model where processing requirements scale with the number and complexity of foreground objects in a video stream. This limits the ability of a video analytics system to analyze a large numbers of camera feeds in parallel.

As described below, a background detector of the disclosure is generally configured to generate a background model of a scene captured in video. The background model includes a background image which has color channel values (e.g., RGB values) or grayscale brightness values for each pixel in the background image. When a new frame is received, the background detector evaluates pixels to determine whether, in that frame, each pixel depicts an element of background or foreground. Once determined, the background detector may create a background/foreground (BG/FG) mask corresponding to the frame. For example, the BG/FG mask may depict every pixel of foreground as white (e.g., 255 in an 8-bit grayscale) and every pixel of background as black (e.g., 0 in an 8-bit grayscale).

In turn, a tracking component or "tracker" of the video analytics system may be configured to identify generally contiguous regions of foreground. In one embodiment, the tracking component determines a bounded region for each area of foreground—such as a best-fit ellipse (i.e., a minimal bounding ellipse that covers each pixel in foreground object. This approach results in a set of ellipses in which each ellipse includes a region of foreground in a current frame. In a simple case, each ellipse bounds a distinct foreground object. However, given occlusion between foreground objects, an ellipse may frequently include pixels related to multiple foreground objects depicted in a video frame. Similarly, a foreground object can be partially occluded by background, so a given ellipse may include both foreground and background pixels. Further still, an object may be fully occluded for a brief period and then reemerge, e.g., where a person walks behind a pillar. Nevertheless, once a foreground object is detected, the tracker may generally attempt to find that object in each subsequent frame evaluated by the tracker (until certain conditions for ending tracking are identified). Thus, ellipses for multiple foreground objects may overlap one another when the foreground objects depicted in the frame themselves partially occlude one another and an object while fully occluded in one sequence of frames may be later reacquired by the tracker after emerging from behind scene background or other foreground objects. The object tracking component described below can efficiently and effectively track foreground objects in a variety of circumstances such as these.

After an ellipse is determined for a newly detected foreground object, the tracker searches for that ellipse in each subsequent frame, until a tracked object is deemed no longer present in the scene. Further, as each foreground object is found in successive frames, the object tracking component updates tracking data for that foreground object. In one embodiment, e.g., the object tracking component maintains an appearance model for the foreground object, size and orientation data for the ellipse, and data regarding whether the foreground object is stationary or in motion. If in motion, the tracking data includes velocity and direction data used to both characterize the behavior of that object as well as help the tracker find that object from frame-to-frame. In addition to helping match the foreground object in the subsequent frames, doing so may also help compensate for a foreground object that remains stationary for a long period, resulting in that foreground object being treated as background by the detector. For example, for foreground objects deemed stationary, the object tracking component continues to identify the foreground object as being depicted in the scene, but as remaining stationary, even if the detector classifies the pixels of that foreground object as depicting scene background. Should the foreground object begin moving (e.g., a car that begins moving after being parked for an extended period), then the tracker can relate the newly moving object to the prior trajectory for that object.

In one embodiment, the object tracking component sorts foreground ellipses identified in each frame into a set of known, discovered, and missing sets. The object tracking component then processes the ellipses of each set.

To build the known set, the object tracking component may compare a size, position, and orientation of a given ellipse in a current frame (N) with the size, position, and orientation of ellipses in the previous frame (N−1). An ellipse in the current frame which matches an ellipse from the prior frame based on this geometric matching may be assigned to the known set. In one embodiment, the tracker confirms the assignment to the known set using a weighted color distribution (WCD) determined from foreground pixels of a "known" ellipse from the current frame (N) and the matching ellipse from the previous frame (N−1). If the comparison fails, then the ellipse in the current frame may be reassigned to the discovered set and the ellipse from the prior frame may be assigned to the missing set.

Otherwise, if the WCD comparison confirms that the foreground object depicted within the ellipse of the current frame is the same as the foreground object in the prior frame, then data representing a trajectory of the foreground object bounded by that ellipse is captured. For example, the video analytics system may capture a set of micro-feature data characterizing the appearance and kinematic properties of the foreground object in each successive frame in which that foreground object is found by the tracking component. Additionally, the tracker may update a model of a foreground object each time an ellipse is determined to have been observed in a frame. Maintaining a trajectory of an object as it moves about a scene allows the video analytics system to learn patterns of behavior related to objects depicted in a stream of video frames by evaluating changes in pixel color values.

The discovered set may include ellipses of foreground objects in the current frame remaining after performing the geometric matching, i.e., any ellipses in the current frame (N) not assigned to the known set. In one embodiment, an ellipse in the discovered set can be reassigned to the known set, after being matched with one of the ellipses in the missing set (which includes ellipses of the prior frame (N−1) not matched to the current frame by the geometric matching and may include ellipses from other previous frames as well). For example, an ellipse initially assigned to the missing set may subsequently be matched with an ellipse in the discovered set after a position of the missing ellipse has been updated using a location particle filter (LOPART) and, in some cases, a size and orientation particle filter (SOPART).

Ellipses which remain in the discovered set after processing the known and missing sets are evaluated against the background image as a secondary check on the background/foreground segmentation performed by the background detector. For example, pixels of an ellipse in the discovered set may be compared to a corresponding set of pixels in the background image using a weighted color distribution (WCD). If pixels of the discovered foreground object sufficiently correlate with pixels in the background image, then the pixels of that foreground object are reassigned as depicting background. Otherwise, the video analytics system may initialize a trajectory beginning with the initial size, position, and orientation of the ellipse bounding the discovered foreground object, a WCD of the ellipse, as well as capture micro-feature data characterizing the appearance and kinematic properties of that foreground object from the current frame (N).

In one embodiment, the missing set includes ellipses identified in previous frames that were not matched to an ellipse in the current frame (N) using the geometric matching process. The tracking component may generally be configured to search the current frame (N) using a location particle filter (LOPART) and if a match is still not found, the tracking component evaluates the ellipse using a predictive geometry matching process. If the LOPART identifies an ellipse at a location where a discovered ellipse was found, then the discovered ellipse at that location may be reassigned to the known set. Additionally, if the size and orientation of the ellipse for the foreground object from a prior frame is a geometric match when applied to the location in the current frame found using the LOPART particle filter, the ellipse can be assigned to the foreground object at the location determined using the LOPART particle filter. Otherwise where the LOPART generates a strong matching location for a missing foreground object, but the prior ellipse does not "cover" the foreground object well, then an ellipse size and orientation particle filter (SOPART) is used to update the ellipse for foreground object. Provided SOPART finds an ellipse to better fit to the location found by LOPART, the tracker updates an appearance model used by LOPART for the next frame.

In one embodiment, logic implementing certain functions of the tracker component introduced above can be executed on either a conventional processor (e.g., a CPU) or a hardware acceleration processing device (e.g., a GPU). As described in greater detail below, tracking detected foreground objects using ellipses representing known, discovered, and missing foreground objects for a current frame (N) on a hardware acceleration processing device (e.g., a GPU) allows the video analytics system to evaluate multiple video streams in real-time. Further, as described below, progressively processing a known, discovered, and missing set of ellipses provides an approach which can effectively and efficiently track objects which exhibit arbitrary changes in appearance, shape, and position, without needing to build a complex model of object behavior for each distinct foreground object. Accordingly, embodiments presented herein provide a detected object tracker for a video analytics system which can scale to analyze a large numbers of camera feeds in parallel. Thus, embodiments presented herein can dynamically track foreground objects within the constraints required to process a video feed in real-time for a very large number of cameras feeds.

FIG. 1 illustrates a network computing environment 100, according to one embodiment of the disclosure. As shown, the network computing environment 100 includes a video camera 105, a network 110, and a server computer system 115. The network 110 may transmit video data recorded by the video camera 105 to the server system 115. Of course, the video camera 105 could be connected to the server system 115 directly (e.g., via USB or other form of connecting cable). Network 110 receives video data (e.g., video stream(s), video images, or the like) from the video camera 105. In addition to a live feed provided by the video camera 105, the server system 115 could also receive a video stream from other input sources, e.g., a VCR, DVR, DVD, computer, web-cam device, or the like.

As an example, assume the video camera 105 is one of multiple video surveillance cameras 105 used to monitor an enterprise campus. In such a case, each video camera 105 would be trained at a certain area (e.g., a parking lot, a roadway, a building entrance, etc.). And each video camera 115 would provide a streaming video feed analyzed independently by the server system 115. Generally, the area visible to the video camera 105 is referred to as the "scene." The video camera 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be encoded using known such formats e.g., MPEG2, MJPEG, MPEG4, H.263, H.264, and the like.

In one embodiment, the server system 115 includes video analytics components (e.g., hardware and software applications) used to analyze the video stream received from the video camera 105. In addition to segmenting scene foreground from background, the video analytics components 120 may be configured to track foreground objects from frame to frame, derive metadata describing the appearance, actions, and/or interactions of such objects (as determined based on changes in pixel color values from frame to frame). The resulting video analytics metadata may be used for a variety of applications. For example, in one embodiment, the output of the video analytics components 120 may be supplied to a machine-learning engine 125. In turn, the machine-learning engine 125 may be configured to evaluate, observe, learn and remember details regarding events (and types of events) that occur within the scene. When observations differ from the learned behavior, the system can generate an alert.

In one embodiment, the video analytics component 120 may normalize the metadata derived from observations of foreground objects into numerical values (e.g., to values falling within a range from 0 to 1 with respect to a given data type). For example, the metadata could include values for multiple features of each foreground object (e.g., values for a height and width in pixels, color, shape, appearance features, etc.). In turn, each value type could be modeled as a statistical distribution between 0 and 1. The video analytics component 120 then packages the resulting normalized values as feature vector for each frame an object appears. The resulting collection of feature vectors provide a trajectory of a foreground object depicted in a scene from the time it first appears to the time it leaves the field-of-view of the camera.

In one embodiment, the machine learning components 125 include a neuro-linguistic module that performs neural network-based linguistic analysis of the feature vectors. To generate the model, the machine learning components 125 receive normalized data values and organize the vectors into clusters. Further, the neuro-linguistic module may assign a symbol, e.g., letters, to each cluster which reaches some measure of statistical significance. From the letters, the neuro-linguistic module builds a dictionary of observed combinations of symbols, i.e., words based on a statistical distribution of symbols identified in the input data. Specifically, the neuro-linguistic module may identify patterns of symbols in the input data at different frequencies of occurrence, up to a maximum word size (e.g., 5 letters). The most frequently observed words (e.g., 20) provide a dictionary of words corresponding to the video stream. Using words from the dictionary, the neuro-linguistic module generates phrases based on probabilistic relationships of each word occurring in sequence relative to other words, up to a maximum phrase length. For example, the neuro-linguistic module may identify a relationship between a given three-letter word that frequently appears in sequence with a given four-letter word, and so on. The syntax allows the machine learning components 125 to learn, identify, and recognize patterns of behavior without the aid or guidance of predefined activities. Thus, unlike a rules-based video surveillance system, which relies on predefined patterns to identify or search for in a video stream, the machine learning components 125 learn patterns by generalizing input and building memories of what is observed. Over time, the machine learning components 125 use these memories to distinguish between normal and anomalous behavior reflected in observed data.

For instance, the neuro-linguistic module builds letters, words (nouns, adjectives, verbs, etc.), phrases, and estimates an "unusualness" score for each identified letter, word, or phrase. The unusualness score (for a letter, word, or phrase observed in input data) indicates how frequently the letter, word, or phrase has occurred relative to past observations. Thus, the behavior recognition system may use the unusualness scores to both identify and measure how unusual a current syntax is relative to a stable model of symbols (i.e., letters), a stable model of words built from the symbols (i.e., the dictionary) and a stable model of phrase built from the words (i.e., the syntax)—collectively the neuro-linguistic model. In addition, as the neuro-linguistic module receives more input data, the neuro-linguistic module may decay, reinforce, and generate letters, words, and syntax phrases over time. In parlance with the machine learning field, the neuro-linguistic module "learns on-line" as new data is received and occurrences increase, decrease, or appear.

In general, the video analytics component 120 and machine-learning components 125 both process video data in real-time. However, time scales for processing information by the video analytics component 120 and the machine-learning component 125 may differ. For example, in one embodiment, the video analytics component 120 processes video data frame-by-frame, while the machine-learning component 125 might process data every N-frames.

Note, however, FIG. 1 illustrates merely one possible arrangement of a network computing environment 100 which includes a video analytics component 120. For example, although the video camera 105 is shown connected to the computer system 115 via the network 110, the video camera 105 could also be connected directly to the server system 115. Further, various components and modules of the server system 115 may be implemented in other systems. For example, the video analytics component 120 could be implemented as part of a video input device (e.g., as a firmware component integrated with a video camera 105). In such a case, the output of the video camera 105 may be provided to the machine learning components 125 on the server 115. Similarly, the output from the video analytics component 120 and machine-learning component 125 may be supplied to other computer systems. For example, the video analytics component 120 and machine learning component 125 may process video from multiple input sources (i.e., from multiple cameras). In such a case, a feed monitor 135 running on client system 130 provides an application used to monitor and control streaming feeds evaluated by the video analytics components 120 and/or the machine learning component 125. Further still, the video analytics components 120 may be adapted for use with a variety of systems in addition to the machine-learning components 125.

Figure 2:
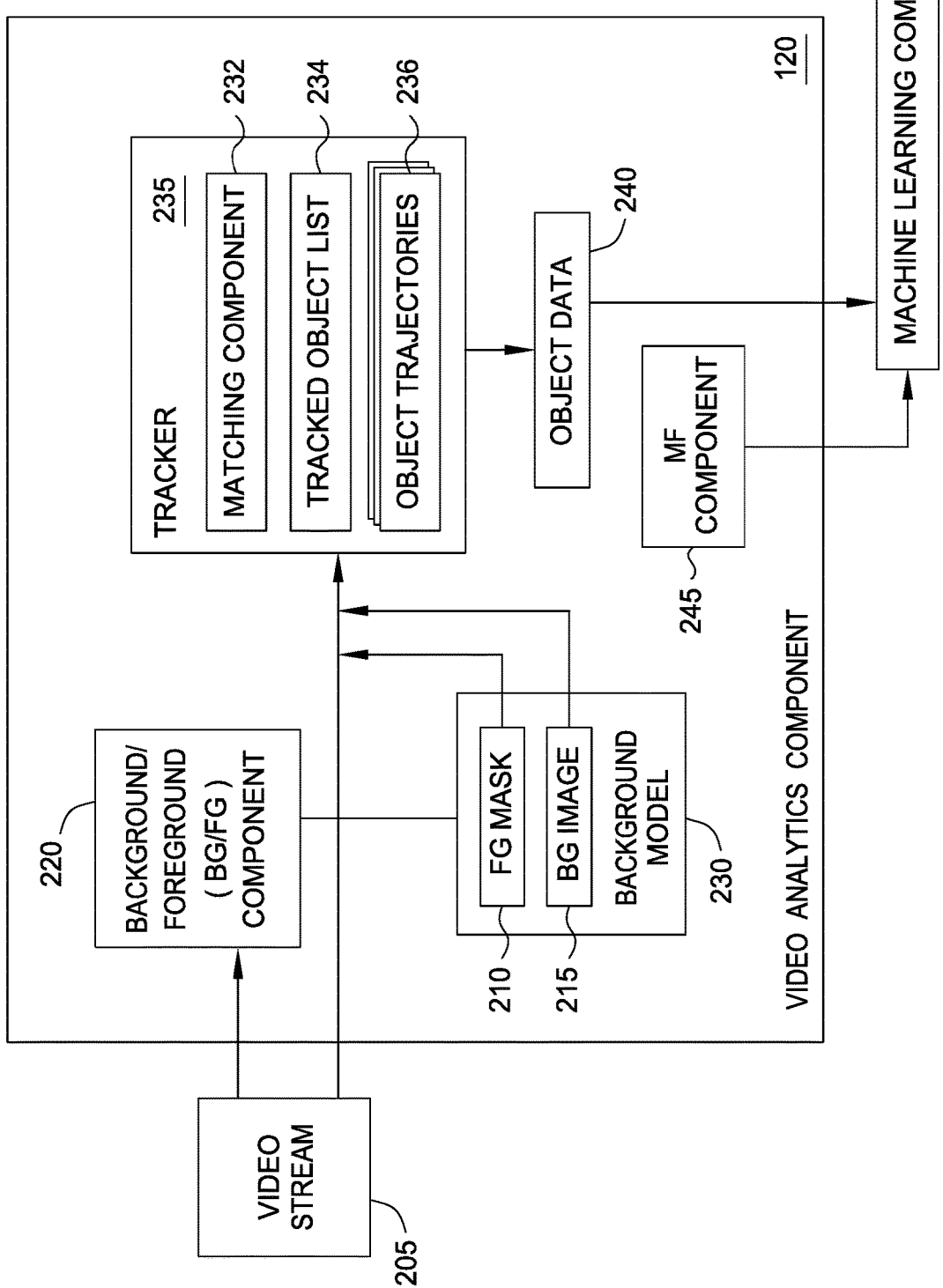
FIG. 2 further illustrates components of the video analytics system shown in FIG. 1, according to one embodiment.

FIG. 2 further illustrates the video analytics component 120 first shown in FIG. 1, according to one embodiment. As shown, the video analytics component 120 includes a background foreground (BG/FG) component 220, a background model 230, a tracker component 235 and a micro-feature (MF) component 245. Video stream 205 represents incoming frames of video received from a video camera (or other source). As also shown, the background model 230 includes a foreground mask 210 and a background image 215.

Images from the video stream 205 provide color channel values (e.g., RGB values) for each pixel in a frame of streaming video. Once received, the background foreground (BG/FG) component 220 segments pixels in the frame into foreground and background. Once segmented, the BG/FG component may generate a foreground mask 210 identifying which pixels depict foreground and which pixels depict background in the current video frame of the stream 205, based on the background model 230. In addition, the BG component 220 updates and outputs a background image 215.

The background image 215 provides RGB values for each pixel in the background model of the scene generated by the BG/FG component 220. Stated differently, the background image 215 provides an image that presents the scene as though only scene background is visible to the camera—an "empty stage." The resulting BG/FG mask 210 identifies the determination of foreground and background for each pixel in a current frame from the video stream 205. In addition, the BG/FG component 220 may update the background model 230 based on the current frame and the resulting BG/FG mask 210. For example, in one embodiment, foreground objects are slowly absorbed into the background, based on the frequency at which the pixels of that foreground object are classified as foreground. As an example, assume a camera trained on a parking lot, when a car parks (and following any passengers emerging), the color values of the pixels depicting the car are "absorbed" into the background model. That is, once the car is parked and stationary, colors of pixels in the foreground object depicting the car may be used to update the color of the corresponding pixels in the background model from frame-to-frame. Eventually, the color of these pixels in the background image 215 reflects the color of the car. As a result, the BG/FG component 220 no longer classifies such pixels as foreground. In one embodiment, the tracker 235 marks an ellipse bounding the foreground object (i.e., the car) as being a stationary foreground object. As a result, even though the BG/FG component 220 may eventually classify the pixels of this foreground object as depicting background, the tracker 235 continues to observe this foreground object (i.e., the car). When the car begins moving again, the tracker can associate the previous trajectory and data captured for this foreground object with this new activity. Doing so extends the knowledge captured by the tracker component 235 to include activity both before and after the car parks for an extended period of time. Further, doing so allows the period of inactivity to become another observed feature of a foreground object used by other components of the video analytics system to learn patterns of object behavior.

Additionally, after the BG/FG component 229 determines a FG mask 210, a collection of foreground objects can be identified independently from frame-to-frame. In one embodiment, the tracker 235 provides a component configured to identify and track foreground objects from one frame to the next. For example, the tracker 235 may identify a collection of foreground blobs in the current frame of the video stream 205 using the FG mask 210. In general, each contiguous region of foreground pixels in the FG mask 210 provides a foreground object which may be tracked from frame to frame. In one embodiment, an ellipse is generated for each such contiguous region and matched with objects observed in prior frames, as described in detail below. For example, the tracker 235 may receive each successive frame of raw-video (i.e., a current frame from stream 205) along with the FG mask 210 and attempt to track the motion of, for example, a car depicted by a given foreground patch as it moves through the scene. Thus, the tracker 235 provides continuity to foreground objects from frame-to-frame for other elements of the video analytics system.

Over time, the tracker 235 builds a tracked object list 234 and an object 236 trajectory for each foreground object as it appears and moves through the scene. The tracked object list 234 represents a current collection of detected foreground objects in a scene along with an appearance model updated each frame. The tracker 235 builds a trajectory 236 which includes the pixel data for a foreground object as it moves through the scene from frame-to frame. In addition, the object trajectories 236 may include a variety of data computed for each tracked foreground object, e.g., a position, speed, direction of movement, rates of change in speed and other motion data.

As a current frame N is received, the matching component 232 uses the tracked object list 234 (in a state as processed up through the frame (N−1) prior to the current frame N) along with the FG mask 210 and the current frame N to match foreground objects detected in the current frame to foreground objects in the tracked object list 234. For each match, the tracker 235 extends the trajectory 236 of an object in the tracked object list 234. In one embodiment, the matching component 232 may generate a set of known, discovered, and missing ellipses for each successive video frame. The known ellipses represent foreground objects in the current frame N which can be matched based on the geometry and position of the ellipse bounding the foreground object with the geometry and position of an ellipse from the prior frame N−1 (or as otherwise discussed below). Color (or grayscale values) for pixels in an ellipse which matches may be compared to the corresponding pixel values for the ellipse in the prior frame to confirm that the same object is depicted in both the previous frame (N−1) and current frame (N). This approach allows foreground objects that can be easily matched based on the size and position of the ellipses to be rapidly identified in each frame with minimal computation, based on the detected objects from the prior frame In one embodiment, the discovered set includes ellipses of foreground objects in the current frame remaining after performing the geometric matching, i.e., any ellipses in the current frame (N) not assigned to the known set and after processing the missing set (which may match a given ellipse from a prior frame to one of the discovered ellipses. The missing set includes ellipses representing foreground objects observed in previous frames that were not matched to an ellipse in the current frame (N) using the geometric matching. That is, any foreground object in the tracked object list 234 that is not matched with an ellipse in the current frame is added to the missing set. Once added, it may remain in the missing set until matched to an ellipse in the current (or subsequent) or until a configurable timeout period. Discovered ellipses (i.e., new foreground objects) may be added to the tracked object list 234. Further, the missing set may also include an ellipse corresponding to a stationary foreground object, i.e., foreground objects, depicted by pixels classified as background after the foreground object has remained stationary in the scene, to be rapidly identified as well. In such case, an appearance matching is performed between the pixels of the missing ellipse and the current frame can be used to identify a stationary foreground object depicted by pixels classified as background. In such cases, missing ellipses depicting stationary foreground objects may be removed from the missing set and an ellipse of the current frame can be added to the known set.

If a match for a given ellipse in this missing set is not found using the geometric matching (or searching for stationary objects), then the matching component 232 may search the current frame (N) using a location particle filter (LOPART) and if a match is still not found, then the ellipse for that object remains in the missing set. Doing so allows the tracker 235 to continue to search for a lost foreground object in subsequent frames as well as match ellipses from the previous frame (N−1) to a "discovered" ellipse in the current frame (N). However, after a specified number of frames (or time), the tracker 235 may conclude a trajectory for a foreground object. For example, in one embodiment, LOPART continues to "look" for the missing object-ellipse for 5 seconds since the last accepted match.

Otherwise, if the LOPART finds a new location for a missing foreground object, then the discovered ellipse set is evaluated to see whether an ellipse of the missing set matches the foreground object at the location identified by the LOPART. If not, then an ellipse size and orientation particle filter (SOPART) attempts to update a size and orientation for the foreground object at a location identified by LOPART. That is, if LOPART finds a new location of the foreground object, but the old ellipse no longer matches the size and/or orientation of the detected foreground object well, a new ellipse size and orientation may be found using SOPART. In cases where SOPART finds a better matching ellipse, then the new ellipse is used to update the appearance model of the now matched foreground object. For example, the tracker 235 may update the WCD, size, orientation, etc., of that foreground object. Should SOPART not provide a better matching ellipse, the known size and orientation of the missing ellipse is matched with the location found by LOPART and the appearance model is updated.

The resulting object trajectories 236 may be output by the tracker 235 as object data 240 for evaluation by a variety of tools, e.g., to learn expected patterns of trajectories and identify unusual trajectories (e.g., a car going the wrong way), unusual interactions between trajectories (e.g., two cars colliding) or other unusual patterns of behavior (e.g., an individual loitering at a subway platform for an unusual amount of time. The MF component 245 may also calculate a variety of kinematic and/or appearance features from the pixels of a foreground object, e.g., shape, symmetry, color, texture, size, height, width, area (in pixels), aspect ratio, reflectivity, shininess, rigidity, speed, velocity, etc. In one embodiment, the resulting appearance and/or kinematic values may be normalized to a value between 0 and 1, packaged as a feature vector (along with an object ID), and output by the video analytics component 120 as image metadata passed to the machine learning component 250. After evaluating the current frame N from the video stream 205, the video analytics component 105 can repeat the process for the next frame of video.

Figure 3:
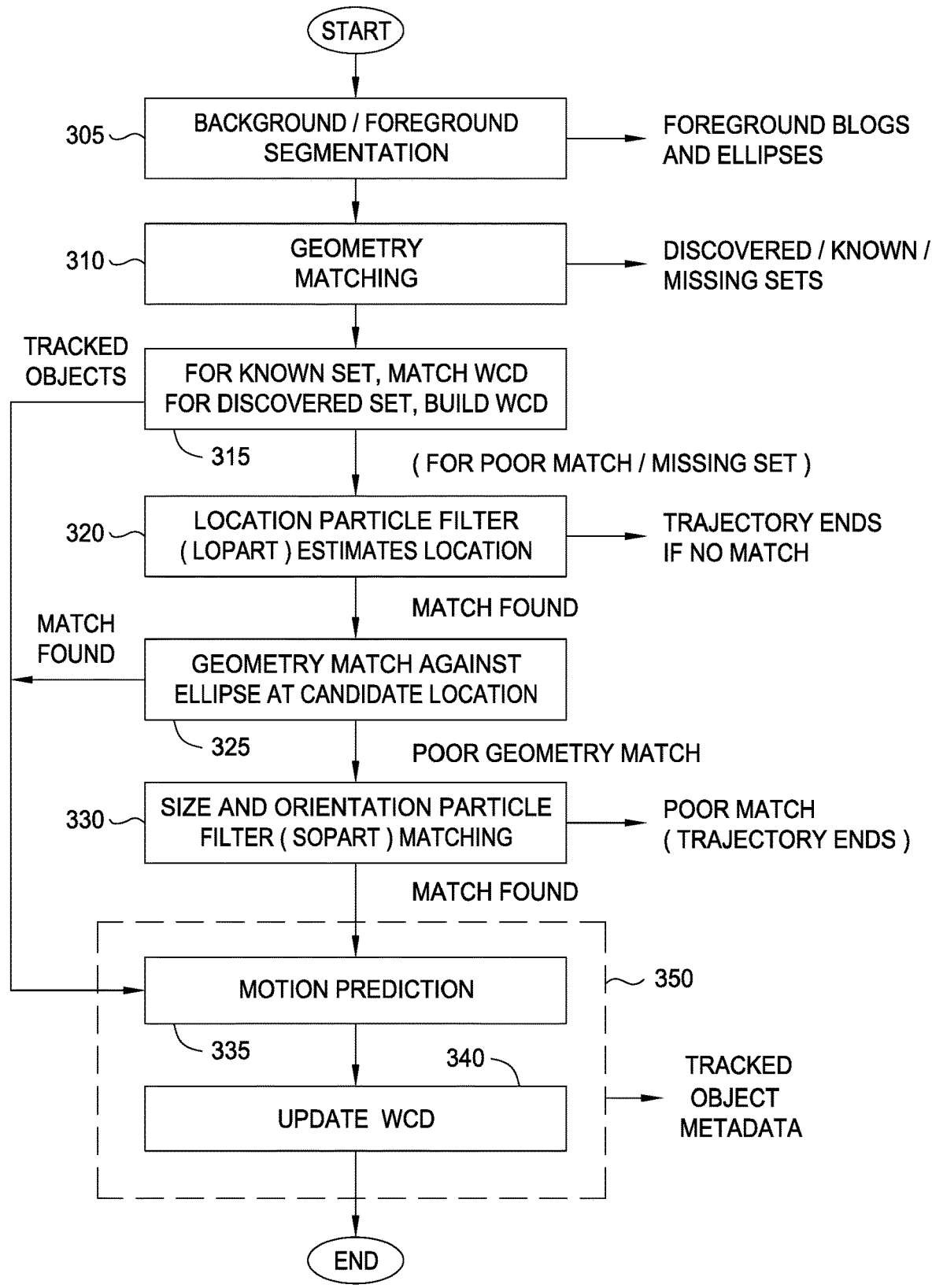
FIG. 3 illustrates a method 300 for tracking foreground objects in a video stream by identifying known, discovered, and missing sets of ellipses representing foreground objects for each frame, according to one embodiment.

FIG. 3 illustrates a method 300 for tracking foreground objects in a video stream by identifying known, discovered, and missing sets of ellipses representing foreground objects for each frame, according to one embodiment. As shown, the method 300 begins at step 305 where the video analytics component receives image data (e.g., RGB pixel values) for a current video frame (N). In response, the BG/FG component generates an FG mask classifying each pixel of the frame as depicting foreground or background and identifies a set of foreground blobs. Each blob may be bounded by a statistically best fitting ellipse which can contain each foreground pixel of the blob. For example, principal component analysis (PCA) (or another technique) may be used to determine the major and minor axes of an ellipse that best fits the foreground object.

At step 310, geometry matching is performed to compare the foreground blobs and ellipses identified at step 305 with the set of ellipses from a prior video frame (N−1). In one embodiment, the geometry matching may include comparing the current-frame foreground ellipse with each ellipse in the prior frame using a heuristic or geometric scoring method, which yields normalized scores on the range of [0,1]. An ellipse from the current-frame is said to match an ellipse in the prior frame if the score between the two is: 1) above a minimum matching score threshold and 2) the highest score among the respective comparisons. Each heuristic score is comprised of a weighted average of independent normalized heuristic scores for ellipse size, ellipse orientation and ellipse center position. The minimum matching thresholds in use may be affected by the spatial proximity of ellipses used in the comparison to other ellipses in the same frame. If an ellipse is considered spatially isolated from other ellipses then the matching thresholds may be somewhat relaxed, while if the ellipse is not isolated a stricter i.e. higher matching threshold may be required. Spatial isolation itself can be decided dynamically based on the relative size, shape, and center position of an ellipse with respect to the size, shape and center position of its neighboring ellipses. Ellipses in the current frame which have a geometric match to an ellipse in the previous frame are added to the known set.

As noted, any ellipse in the current frame N not resulting in a geometric match to an ellipse in the prior frame (N−1) (or ellipse in the missing set) is initially added to the discovered set. Such ellipses may subsequently be appearance matched with an ellipse in the missing set (resulting in another ellipse in the known set) using an appearance matching or motion flow search. Ellipses in the discovered set may also be discarded (e.g., following a WCD comparison with the ellipse and a corresponding region of the background image). Conversely, any ellipse from the prior frame (N−1) not matched to an ellipse in the current frame (N) is added to the missing set.

Note, an ellipse in the missing set may correspond to a foreground object that appeared in the scene which then became stationary within the scene. After remaining stationary for a threshold amount of time, pixels of a stationary foreground object may begin to be classified as background. In one embodiment, the threshold may be determined relative to a frequency at which pixels depicting the stationary foreground object are classified as background and/or foreground. As a result, over time, the BG/FG detector may classify pixels depicting that foreground object as being background, resulting in no foreground ellipse being generated. To compensate, in one embodiment, objects in the tracked object list 234 may be marked as being moving or stationary. Ellipses from the N−1 frame added to the missing set which are also marked as depicting a stationary foreground object may be appearance matched using the ellipse of the stationary, missing foreground object applied to pixels of the current frame (N). If an appearance match finds the stationary foreground object, then the ellipse is cleared from the missing set and added to the known set, as the foreground object remains in the scene and is presumed to have remained stationary. In one embodiment, a normalized cross-correlation technique can be used to perform this appearance matching. This technique gives the matching score within [0, 1] range—with value closer to 1 indicates a good match. In such a case, the tracker 235 continues to update the appearance model (i.e., trajectory 236) of the ellipse as being a tracked foreground object in the current frame (N), despite being classified by the BG/FG detector as background.

To restate, at step 310, the tracker 235 uses geometry matching between ellipses in the current frame N, previous frame (N−1) and ellipses in the missing set (if any) to generate and/or update a set of a known, discovered and missing set of ellipses. The missing set may typically persist across multiple frames (e.g., due to foreground object occlusion), while the "known" and "discovered" set are generated anew for each successive frame. Each set is then further processed by the tracker 235 component, as described below. In one embodiment, the known set is generally processed first, followed by the missing, and then the discovered set. Alternatively, sets of ellipses may be processed simultaneously, e.g., using parallel processing on a GPU, until all ellipses have been fully processed, including any ellipses reclassified from one set to another (e.g., where a discovered ellipse is reclassified to the known set).

At step 315, appearance matching is used to confirm ellipses in the known set correspond to a previously tracked foreground object (based on the geometric match to an ellipse in the prior frame (N−1)). In one embodiment, ellipses in the known set are evaluated using a weighted color distribution (WCD). The WCD counts the number of occurrences of each distinct color in the foreground pixels bounded by an ellipse. Pixels closer to the center of the ellipse are given more weight than pixels near the edge. For example, in one embodiment, the WCD is computed relative to a region of pixels in the ellipse defined by the biggest square which can be circumscribed within the ellipse. In such a case, a Gaussian distribution may be used to weight pixels near the center of the square more strongly than pixels near the edges. For ellipses in the known set, the WCD is compared to a WCD generated from corresponding pixels in the prior frame (i.e., the pixels from the ellipse upon which the match is based. In one embodiment, to compare the WCDs, a Bhattacharyya coefficient may be computed to provide a measure of overlap between two WCDs. If the WCDs match within a given threshold (e.g., if the Bhattacharyya coefficient is above a specified threshold), then the known ellipse is confirmed as depicting the same foreground object as the one from the previous frame (or from the missing set). Of course, other approaches for appearance matching could be used as well. While the value of the threshold may be set as a matter of preference, in practice, a value of 0.7 has proven to be effective. If the WCDs do not match, the "known" ellipse is reassigned to the discovered set, where it can be compared with the background image before being confirmed and tracked as a detected foreground object. Additionally, the ellipse from the frame N−1 is added to the missing set.

As shown, ellipses in the missing set are processed following step 315. Again, ellipses in the missing set generally correspond to ellipses bounding foreground objects detected in a prior frame (or a stationary foreground object) which remain unmatched to an ellipse of a foreground object in the current frame (N) by the initial geometric matching. At step 320, a location particle filter (LOPART) is used to identify candidate locations in the current frame to search for a match to a missing ellipse. A particle filter generally refers to a sequential Monte Carlo method based on point mass (or "particle") representations of probability densities. The participle filter approach "throws" a set of particles from the location of the missing ellipse (e.g., from a geometric center) according to an estimate of motion of that foreground object. The motion estimation is based on the tracked movement, direction, and velocity of the ellipse generated by the tracker in tracking this foreground object in previous frames. However, a measure of randomness (using the Monte Carlo method) is introduced so that each particle can "land" at a different location. Gaussian weighted average of the most likely particle-candidates thrown by LOPART may be used as a candidate for a new geometric center of the missing ellipse in the current frame.

In one embodiment, as described below, an appearance matching process may be used to evaluate the appearance of pixel values surrounding each respective particle with the appearance values of the foreground object represented by the missing ellipse. If a Gaussian weighted average of all the distances (derived from the matching scores for all most likely—re-sampled—particles) is below a distance threshold, then the foreground object represented by the missing ellipse is deemed to have been found in the current frame. For example, in one embodiment, a log polar matching approach may be used to evaluate regions of pixels surrounding a candidate location. In this approach, pixels surrounding a candidate location are compared with pixels corresponding to the missing ellipse using a triangle inequality. An example of this approach is described below. In one embodiment, if the Gaussian weighted average of the distances does not satisfy the required threshold, then the foreground object is considered lost relative to the current frame and the ellipse corresponding to the foreground object remains in the missing set. This may occur, e.g., where a foreground object detected in one frame is occluded by another foreground object or by a background object in a subsequent frame.

In one embodiment, if an appearance match in the current frame is found for the foreground object represented by the missing ellipse, the tracker also determines an ellipse to represent this foreground object in the current frame. For example, the tracker may perform a geometric matching to compare the missing ellipse (centered at the location identified by LOPART) and the nearest ellipse in the discovered set. At step 325, in one embodiment, if a discovered ellipse has a geometric center which matches a location identified using the particle filter (within some tolerance threshold), then predictive geometry matching may be used to compare the missing ellipse (at the location determined by LOPART) with the discovered ellipse. The tracker 235 may treat such an ellipse as depicting a foreground object in motion that has moved to a location determined by the particle filter, based on a match between the size and orientation of the missing ellipse and one or more of the discovered ellipses If predictive geometric matching fails to match the LOPART-tracked missing ellipse with any of the discovered ellipses, at step 330, a size and orientation particle filter (SOPART) is used to estimate a size and orientation of an ellipse using the location identified using the LOPART particle filter and the appearance matching.

After processing ellipses in the known and missing sets (as discussed above), any ellipses of the current frame which remain in the discovered set may be considered to be new foreground objects. New foreground objects may then be searched for and tracked in subsequent frames. However, in one embodiment, the tracker 235 first confirms that a discovered ellipse represents a foreground object by comparing a WCD of the discovered ellipse with a WCD generated using corresponding pixels of the background image. If the WCDs match, then the discovered ellipse is reclassified as part of background and discarded from the further evaluation for tracking. Otherwise, the tracker 235 initializes a trajectory for the new object. That is, the foreground object in the discovered ellipse becomes a tracked object to be searched for in subsequent frames.

At step 335, motion prediction is performed for each foreground object in the current frame associated with an object in the tracked object list 234. As noted, the motion prediction is used to estimate how the foreground object is moving within the scene (e.g., direction, and velocity) based on the object data captured for each object in each prior frame which included that object. Such motion prediction may be used to search for the foreground object in subsequent frames using the techniques described herein. In addition, the WCD of foreground pixels in the tracked objects may be selectively updated (step 340). In one embodiment, the WCD of a tracked foreground object is updated if a high confidence appearance match (or predictive geometry match) is found between the ellipse in a prior frame and the "known" ellipse.

Figure 4:
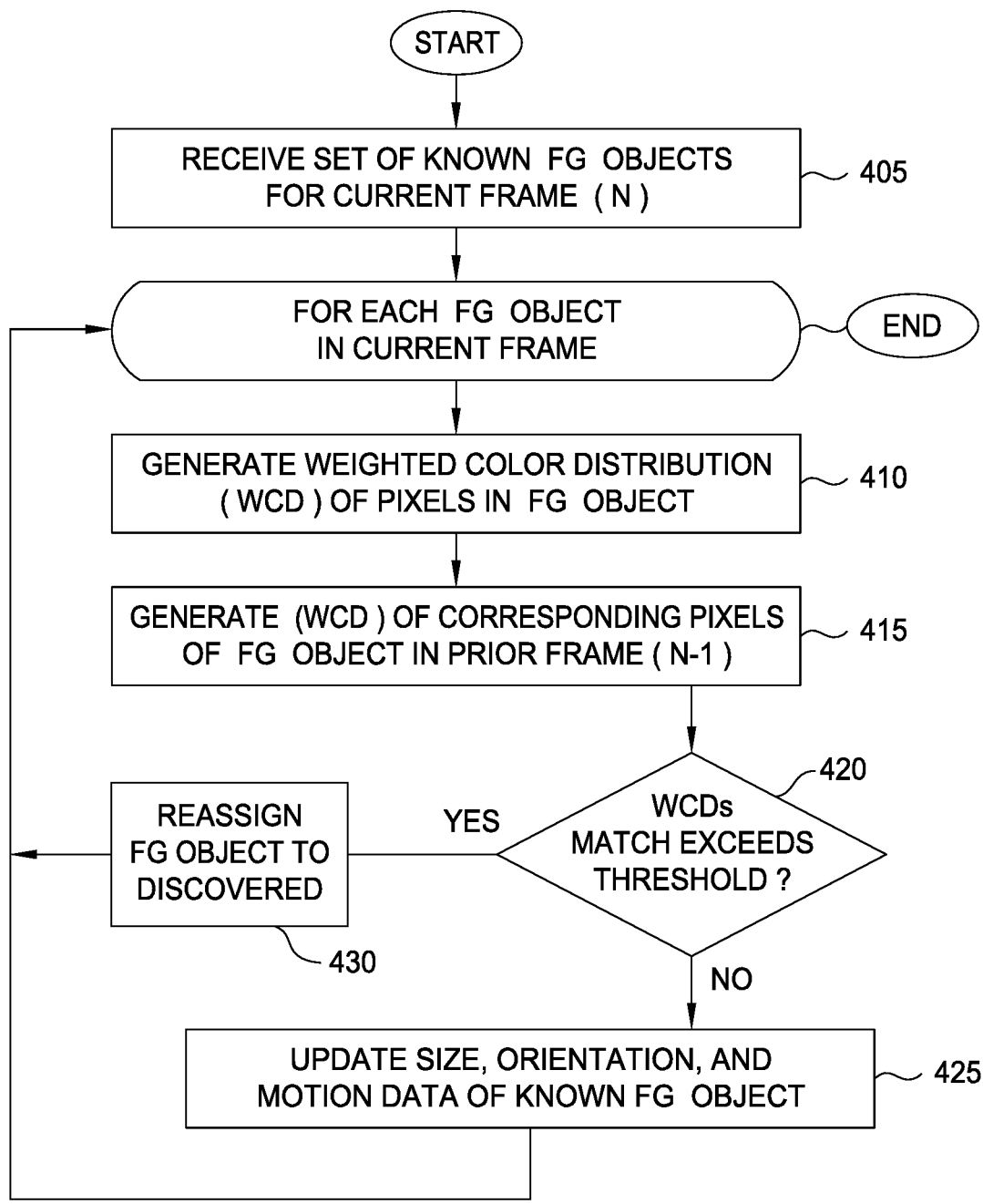
FIG. 4 illustrates a method for processing a set of known foreground objects depicted in a video frame, according to one embodiment of the disclosure.

FIG. 4 illustrates a method 400 for processing a set of known foreground objects depicted in a video frame, according to one embodiment of the disclosure. As shown, the method 400 begins at step 405 where the matching component of the tracker receives a set of ellipses corresponding to foreground objects classified as "known" for a current frame (N). As noted, each known foreground object is identified by matching a size, orientation, and location of a best-fit ellipse of a foreground object in the current frame with an ellipse bounding a known (or discovered) foreground object in the prior frame. At step 410, the matching component generates a weighted color distribution (WCD) of the foreground pixels contained within the best-fit ellipse. Note, typically, the conformation of the foreground blob results in some pixels of the ellipse that were classified as depicting background.

At step 415, a WCD is generated (or retrieved) for the foreground pixels of the matching ellipse in the prior frame (N-1). At step 420, a measure of similarity between the two WCDs is determined. As noted, a Bhattacharya coefficient may be computed to provide a measure of overlap between two WCDs. If the WCD similarity exceeds a threshold, then the foreground object and known ellipse are reassigned to the set of discovered ellipsis (step 430). That is, while the pixels of the ellipse were assigned as depicting foreground, the colors do not match the colors of the foreground object detected in the prior frame. As a result, the foreground object of the current frame is tracked as a discovered object (provided the now discovered ellipse is confirmed as a foreground object using the method of FIG. 6, discussed below). And the matching ellipse from the prior frame (N-1) is added to the missing set (and processed using the method of FIG. 5, discussed below).

Otherwise, if the WCD confirms the known foreground object depicted within the ellipse matches the foreground object of the ellipse from the prior frame identified using the geometric matching, then the tracker updates the size, orientation, and motion data of the known foreground object (step 425). That is, the tracked object data of a tracked foreground object is updated. The process of steps 410-430 is repeated to process each known foreground object identified for the current frame by the geometry matching process.

Figure 5:
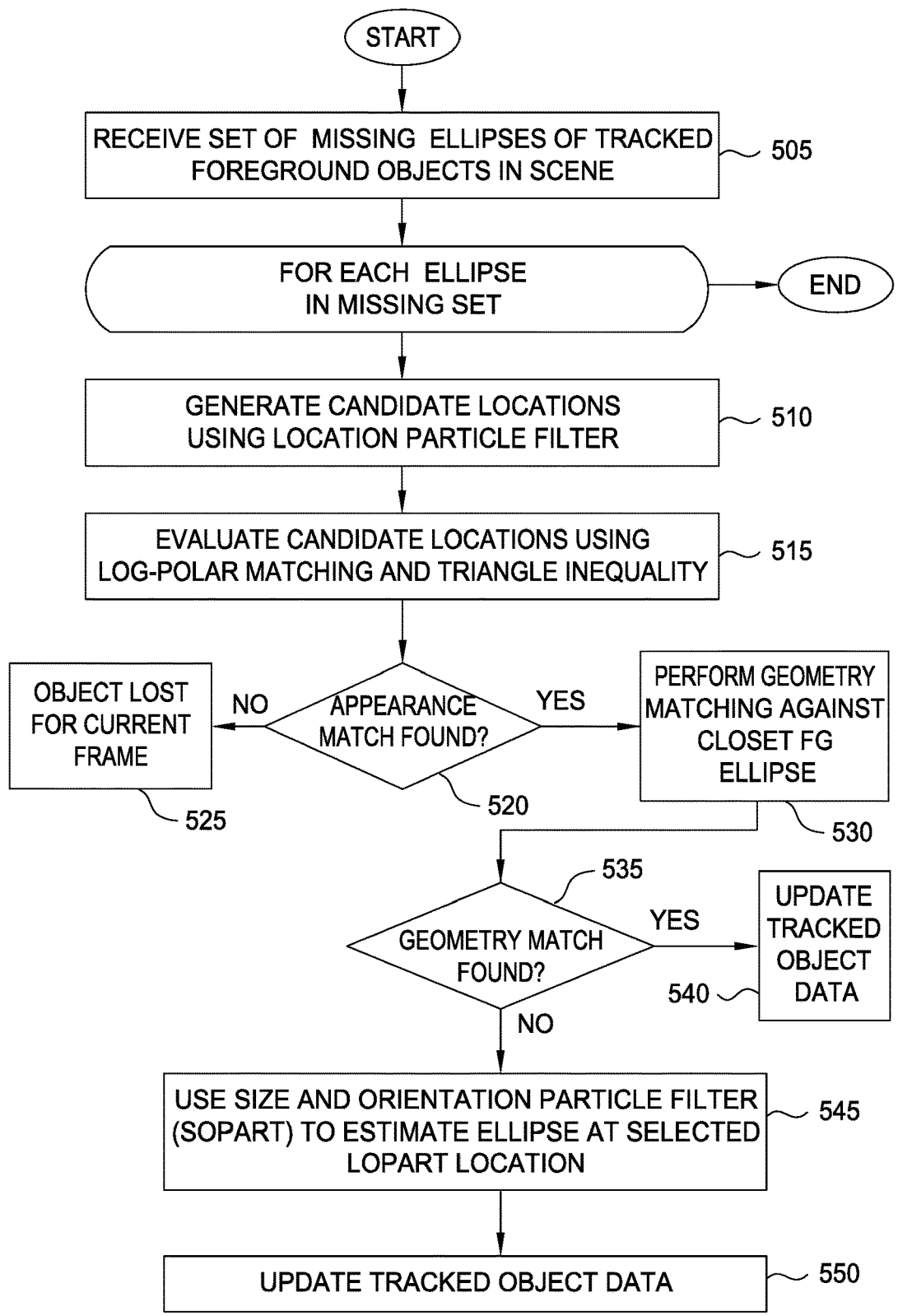
FIG. 5 illustrates a method for processing a set of missing foreground objects depicted in a video frame, according to one embodiment of the disclosure.

FIG. 5 illustrates a method 500 for processing a set of missing foreground objects depicted in a video frame, according to one embodiment of the disclosure. As shown, the method 500 begins at step 505 where the matching component of the tracker 235 receives a set of missing ellipses corresponding to foreground objects tracked in prior frames that were not matched to an ellipse in the current frame using the predictive geometry matching process described above. As noted, while the "known" and "discovered" sets are generated for each frame processed by the tracker 235, the "missing" set persists across frames.

Following step 505 a loop begins to process each ellipse in the missing set. At each pass through the loop (steps 510-550), the matching component of the tracker 235 searches the current frame for a region of foreground to match with one of the ellipses in the missing set. Each time a match is found; the ellipse is removed from the missing set, reassigned to the known set, and used to extend a trajectory of a foreground object in the current frame.

At step 510, the matching component of the tracker generates a set one or more candidate locations for a center of the ellipse for the missing foreground object in the current frame. In one embodiment, the tracker 235 uses a location particle filter (LOPART) to distribute a set of particles based on the prior observed motion of the missing foreground object and a measure of randomness. Generally, each particle is "thrown" to suggest a candidate location for a geometric center of an ellipse of the foreground object corresponding to the missing ellipse. The center is then used to perform an appearance matching process described below.

At step 515, the tracker 235 evaluates the location of a candidate particle under consideration as a potential match for a center of the missing ellipse. For example, the tracker may compare appearance values of pixels surrounding the location of the candidate particle to appearance values of the foreground object represented by the missing ellipse. For example, in one embodiment, the tracker 235 subdivides a region of the ellipse bounding the foreground object in the missing ellipse into a set of bins and determines an average color value for each bin for each of a red, green, and blue color channel. The tracker 235 performs the same calculation for a region of pixels in the current frame (N) centered at the location identified by the candidate particle under consideration. The area around the center pixel is divided in regions based on a log polar mapping originating from this center pixel. This mapping inherently creates smaller bins toward the center of the region, thus assigning a higher statistical significance to pixels found in bins closer to the area center. A comparison score for each bin (per color channel) is then determined, and a sum of the scores provides a measure of similarity between the foreground object in the previous frame and the candidate region of the current frame. That is, the tracker 235 computes an average color pixel value (RGB) in each region. In one embodiment, the resulting averages are used to determine a normalized appearance score based on a triangle inequality. The triangle inequality may be determined relative to the average RGB score determined for the candidate location and surrounding color values of the current frame (N) and the foreground appearance values of the foreground object corresponding to the missing ellipse under consideration. This approach increases the importance of pixels closer to the center of the ellipse as well as provides some scale and rotation invariance.

Figure 7A:
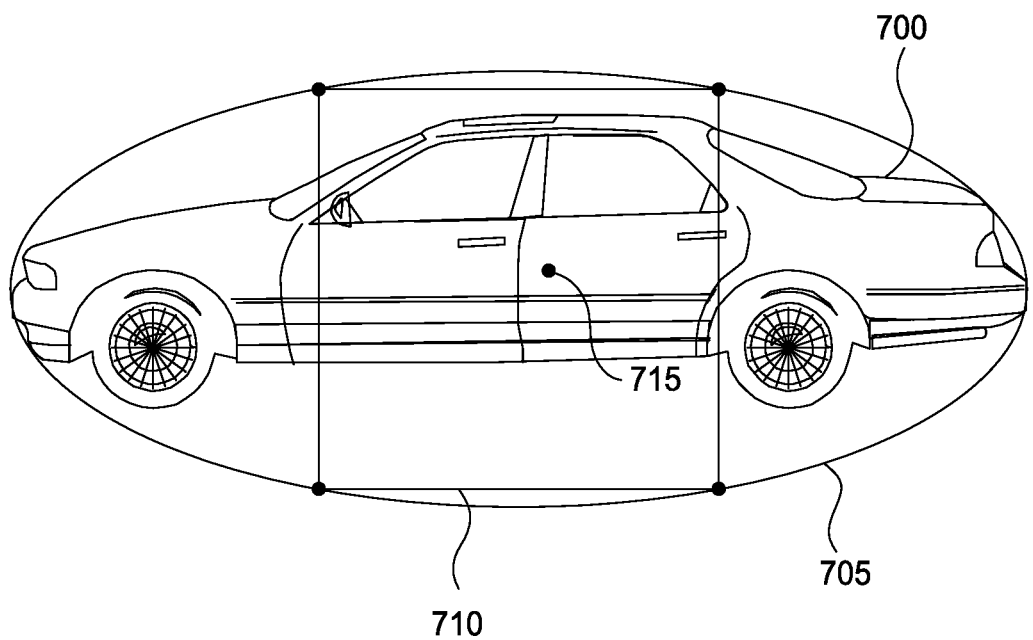
FIGS. 7A-7C illustrate an ellipse bounding a foreground objects and a log polar comparison used to measure the similarly of a reference foreground object and a candidate matching foreground object, according to one embodiment of the disclosure

For example, FIG. 7A shows a foreground object 700—in this example a vehicle—bounded by an ellipse 710 centered at point 715. Assume for this example that the ellipse 705 is assigned to the missing set—i.e., ellipse 705 bounds the foreground object in a prior frame and has a size, position, and orientation that does not match an ellipse bounding a detected foreground object in the current frame (N). As noted, the tracker 235 may subdivide a region 710 of the ellipse 705 into bins and perform the same segmentation on a region of the current frame centered at a location of a particle "thrown" by the location particle tracker.

Figure 7B:
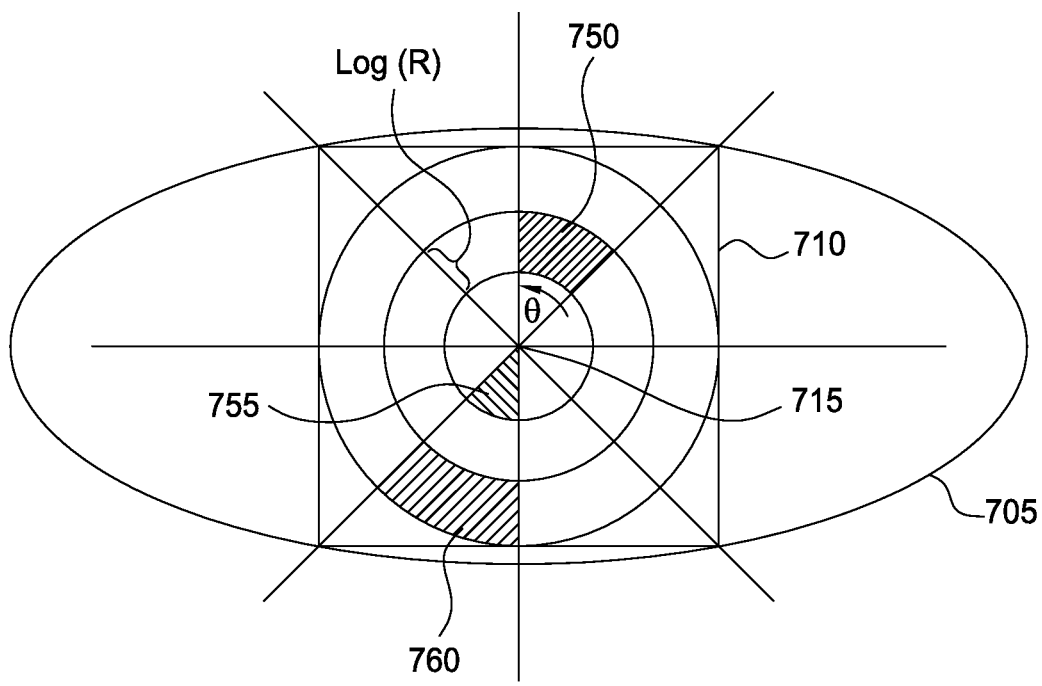

In one embodiment, the regions may be defined using a log polar coordinate system. For example, FIG. 7B shows a set of bins, e.g., bins 750, 755, and 760, superimposed over the region 710. In this example, each bin is generated using a generating angle and a log (radius (r)) unit distance from the center 715. In this example, the generated angle uses theta values of 45 degrees. This results in a center disk with eight equal sized regions and successive rings, each having eight regions within the ring. Further, using the log value of the radius (r) to measure distance from the center results in regions nearer the center covering a smaller number of pixels, thereby increasing the weight of pixels near the center over pixels in regions farther away from the center (which have larger numbers of pixels per region in each ring extending away from the center).

That is, using a log based value for (r) results in smaller regions near the center 715 and larger regions at each successive ring. Doing so results in pixels near the center 715 having greater influence on the similarity calculation than pixels in the outer rings. Further, while the value of theta may be set as a matter of preference, a value of 30 degrees has proven to be effective at least in some cases. Further, using four units (i.e., a range for log(r) from 0 to 4) for log (r) results in 48 bins and has proven to be effective at least in some cases. In such a case, the one slice of bins would include pixels covered by the regions defined by values of (r) between 0 and 30 degrees, and budded using values of log(r) between 0 and 1, 1 and 2, 2 and 3, and 3 and 4. Of course, more or less bins could be used and a binning scheme other than the log (r) polar coordinate system described above could be used as well.

Figure 7C:
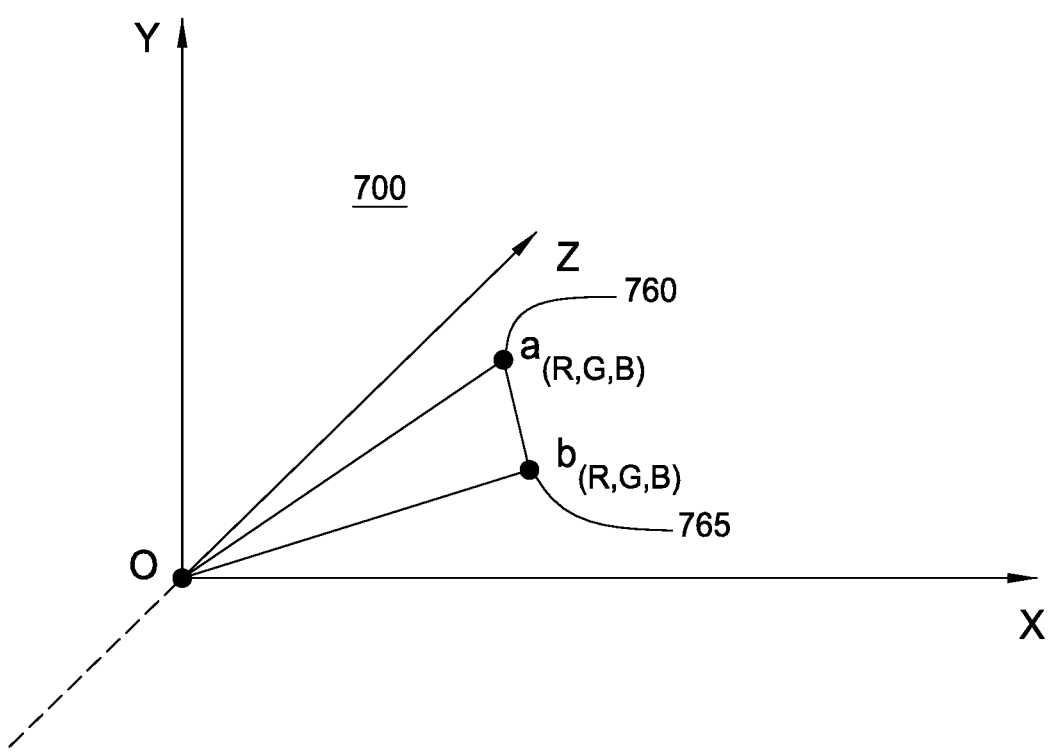

In one embodiment, color channel values for pixels in each bin are then used to determine an overall similarity score for a given candidate particle and the foreground object of the missing ellipse. Color channel values for each pixel in a bin may be averaged. In an RGB color space, doing so results in an average red, blue, and green, value for each bin. That is, an average for a given bin for both the missing ellipse and the candidate region are computed per color channel. In one embodiment, the similarity score for each bin can be computed by treating the RGB average for the particle and the missing ellipse as a point in a 3-dimensional (3D) space. For example, FIG. 7C illustrates an RGB point $a_{(R,G,B)}$ 760 and a point $b_{(R,G,B)}$ 765, both plotted in an XYZ space 700. Point a represents an average of colors in a bin in a reference ellipse (i.e., pixels of the missing foreground object) and a point $b_{(R,G,B)}$ 765 representing a candidate location identified using one of the LOPART particles. In such a case, the score can computed as follows:

$$\sum 1 - \frac{\|b-a\|}{\|a-O\| + \|b-O\|}. \qquad \text{Eq 1}$$

In equation 1, the sum of the similarity scores of all the bins represents the overall measure of similarity between a reference ellipse (bounding a foreground object in a missing ellipse) and pixels in the current frame (N) centered on a particle. In one embodiment, the candidate particle which generates the greatest similarity score is used as a location for the center of an ellipse matching the foreground object corresponding to the missing ellipse. In equation 1, a and b are vectors and O corresponds to the origin of the XYZ space. The vector $\|b-a\|$ indicates the length of the vector ab, while the length of the vector $\|a-0\|$ and $\|b-0\|$ indicate the length the individual vectors a and b from the origin O. Note that if b is very close in space to a, then $\|b-a\|$ will be close to 0 and it will contribute a distance close to 0. Then, if all vectors are similar, the final I match score generated using Eq. 1 will be close to 1.

A similarity score computed in the manner just described may also be subject to a minimum threshold. In another embodiment, a weighted average of the most likely candidates may be used to determine a location for a center of an ellipse of a foreground object in the current frame corresponding to the foreground object of the missing ellipse. Conversely, if no candidate particle or weighted average of scores for most likely candidate particles generates a similarity score that meets the minimum similarity threshold, then the tracker treats the foreground object corresponding to the missing ellipse as being lost in the current frame. In such a case, the missing ellipse remains in the missing set and evaluated in subsequent frames. In one embodiment, missing ellipse is kept for 5 seconds since the last good match above a similarity threshold (calculated using Eq. 1, above) of 0.7. Thereafter, a trajectory for such a foreground object is treated as complete. In another embodiment, if the tracker finds an appearance match in the current frame N for the foreground object corresponding to the missing ellipse, then the tracker also assigns an ellipse to represent that foreground object in the current frame.

Referring again to FIG. 5, at step 520, if one (or more) candidate particles generate a similarity score meeting the minimum similarity threshold, then the particle which results in the greatest similarity (or a weighted average of the N most likely candidates) are evaluated using predictive geometry matching (step 530), as described above relative to step 310 of FIG. 3. Generally, the ellipse bounding a missing foreground object is superimposed on the current frame using the location determined using the LOPART as the center of that ellipse. The ellipse in the current frame retains the same size orientation of the missing ellipse, but the center is located based on the LOPART particles and the triangle inequality matching discussed above. The ellipse in the current frame is then predictive geometry matched against the closest ellipse in the discovered set. If no match is found, then at step 625, the ellipse (and corresponding foreground object) remains in the missing set).

If the predictive geometry matching results in a match that exceeds a minimum threshold (step 535), then the matching ellipse from the discovered set is reassigned to the known set and that discovered ellipse—in its entirety—is used as the representation of that tracked object for the current frame. In other words, at step 540, the tracking trajectory for the object corresponding to the missing ellipse is updated using the matching ellipse reassigned from the discovered set.

Otherwise, at step 535, if a predictive geometry match fails to produce a match, then, at step 545, a size and orientation particle filter (SOPART) is used to identify a size and orientation for an ellipse to bound the foreground object found using the LOPART appearance matching process described above. For every known ellipse, the tracker may capture statistics of size and orientation for foreground objects at a given location or regions within the frame (just like the velocity statistics for all known ellipses). Monte Carlo techniques are used to throw the particles with above size/orientation statistics at the LOPART identified location. The same log-polar and triangular-inequality analysis described above may then be used is used to determine a matching score between the candidate particle ellipse and the corresponding ellipse in the raw-frame In one embodiment, the highest matching score (potentially above a minimum threshold) is used as the new ellipse for the foreground object at the location found by LOPART. Alternatively, an average of N ellipses with the highest scores (or scores above a threshold) may be used to determine a size and orientation for an ellipse. In one embodiment, if SOPART does not estimate an ellipse with a confidence score having a minimum threshold, then the size and orientation of missing ellipse may be assigned to the foreground object in the current frame.

At step 550, tracking data (i.e., a trajectory 236) for the new ellipse (or assigned missing ellipse) is updated for the foreground object and corresponding ellipse matched while processing the missing ellipse under consideration. If additional missing ellipses remain to be evaluated then the tracker component 235 selects another missing ellipse to consider and returns to step 510.

Figure 6:
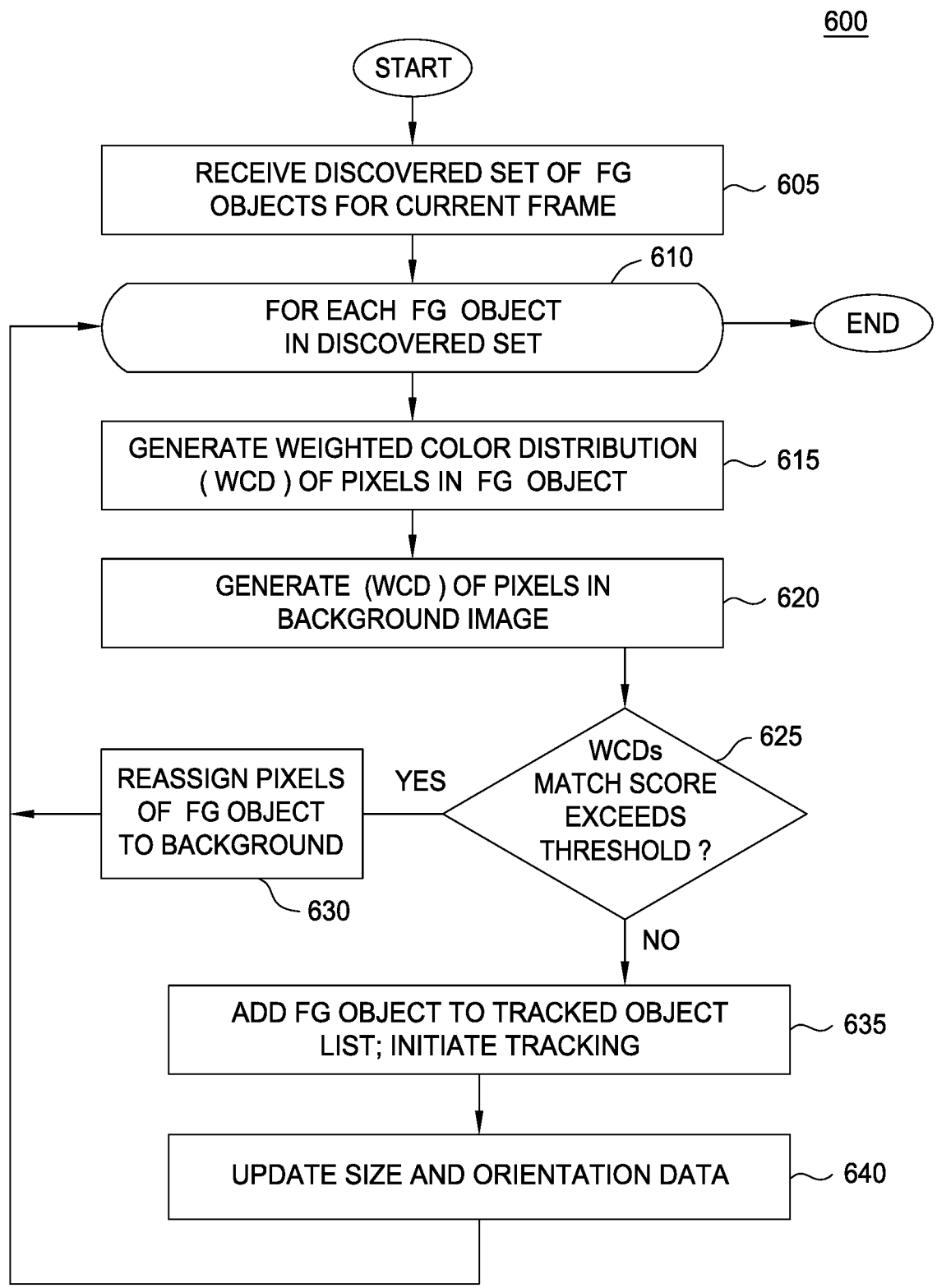
FIG. 6 illustrates a method for processing a set of discovered foreground objects depicted in a video frame, according to one embodiment of the disclosure.

FIG. 6 illustrates a method 600 for processing a set of discovered foreground objects depicted in a video frame, according to one embodiment of the disclosure. As shown, the method 600 begins at step 605 where the matching component of the tracker 235 receives a set of discovered foreground objects in a current frame (N). As noted, each discovered foreground object corresponds to a foreground object of the current frame (N) that does not match with any ellipse in the prior frame (N−1) (or matched to an ellipse from the missing set). That is, geometry matching is used to pair previously known ellipses in the previous frame (N−1) with ellipses in the current frame (N). As noted, the tracker may generally process the discovered set after processing the known and missing sets. This is because in processing the missing set, some discovered ellipses may be paired with corresponding ellipses in the missing set. In such case, such ellipses are removed from the discovered set prior to processing according to the method 600.

A processing loop (steps 615-640) then evaluates each ellipse in the discovered set. In one embodiment, ellipses in the discovered set may be processed in parallel using distinct processing paths on a GPU. At step 615, the matching component generates a weighted color distribution (WCD) of the foreground pixels contained within the ellipse of the discovered foreground object being evaluated by current pass of the processing loop. At step 620, a WCD is generated based on the same pixels from the background image. That is, the ellipse of the foreground object and the FG/BG mask is used to select a set of pixels from the background image to use in generating a WCD. At step 625, a measure of similarity between the two WCDs is determined. As noted, a Bhattacharya coefficient may be computed to provide a measure of overlap between two WCDs. At step 630, if the WCD similarity exceeds a threshold, then the discovered foreground object is reassigned as depicting background. That is, if the colors of the pixels within the ellipse of the discovered foreground object are highly correlated with the color of the corresponding pixels in the background image, then that discovered object is no longer considered for tracking.

Otherwise, the discovered foreground object is confirmed as a newly detected foreground object, and at step 635, the tracker 235 adds this foreground object to the tracked object list and initiates a trajectory 236 for this object. Accordingly, at step 640, the tracker updates the size, orientation, and motion data for the tracked object. The processing loop of steps 615-640 is repeated to process each known foreground object identified for the current frame by the geometry matching process.

Figure 8:
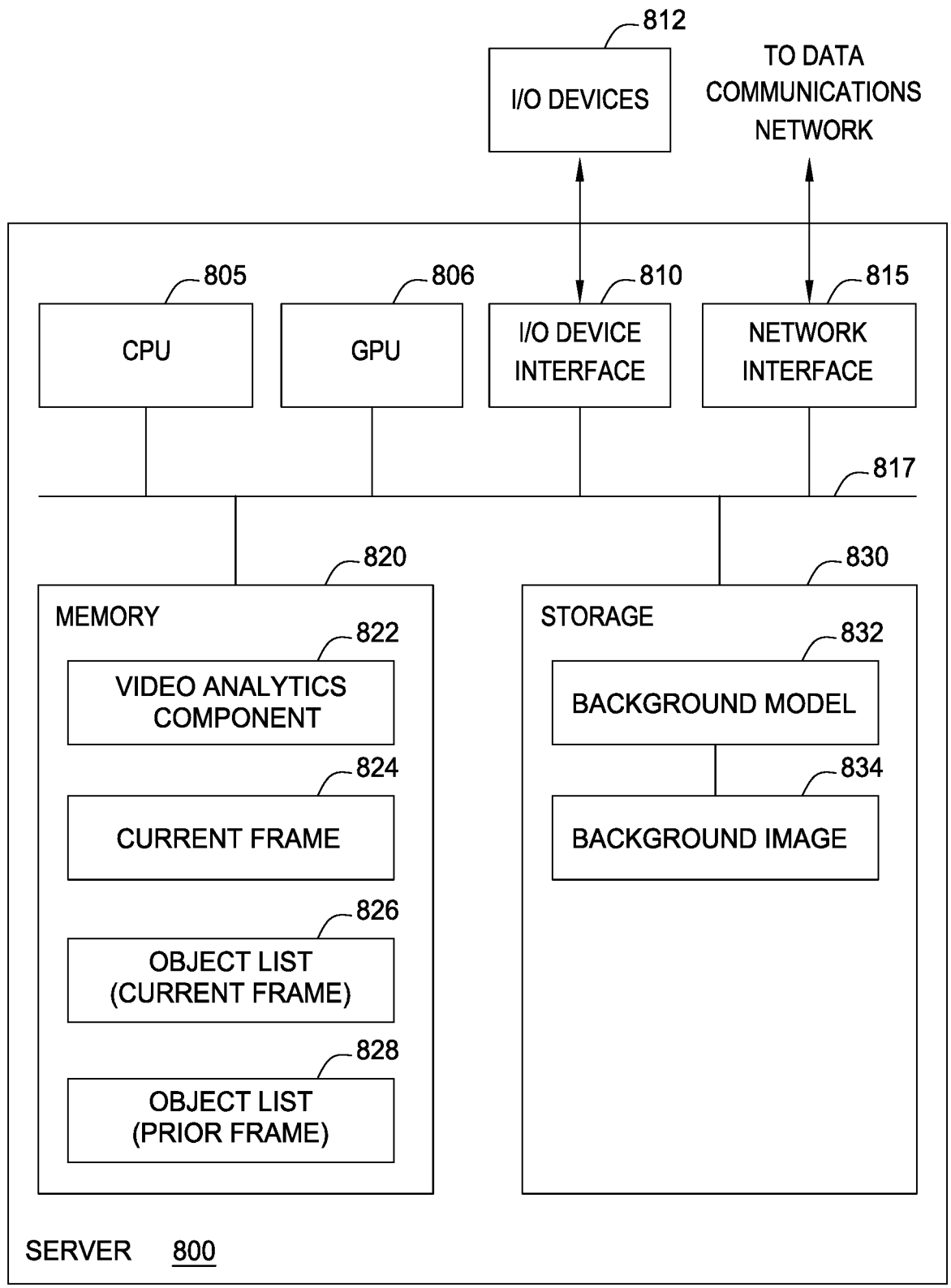
FIG. 8 illustrates an example of computing server which includes a video analytics system, according to one embodiment of the disclosure.

FIG. 8 illustrates an example of computing server 800 which includes a video analytics component, according to one embodiment of the disclosure. As shown, the computing system 800 includes, without limitation, a central processing unit (CPU) 805, a graphics processing unit (GPU) 806, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network (SAN).

The graphics processing unit GPU 806 is a specialized integrated circuit designed to accelerate the image output in a frame buffer intended for output to a display. GPUs are very efficient at manipulating computer graphics and are generally more effective than general-purpose CPUs for algorithms where processing of large blocks of data is done in parallel using a set of parallel processing pipelines. In one embodiment, components of the matching component and tracker discussed above may be implemented to process frames of a video stream in parallel on GPU 806. For example, the weighted color distribution of foreground pixels in multiple ellipses may be computed using the GPU 806. Similarly, the LOPART, SOPART, and log (r) polar appearance matching between two ellipses may be computed on the GPU 806. Thus, the similarity score between each of the 48 bins may be computed simultaneously. Further, in addition to evaluating blocks of pixel data of the background image, background model and raw image on the GPU 806 in parallel, other components of the video analytics system may be implemented to execute on GPU 806. For example, the micro-feature classifier may determine the kinematics or appearance features of a foreground object using GPU 806 as well as generate elements of feature vectors characterizing the trajectory of multiple tracked objects in parallel. More generally, the video analytics component 822 may use GPU accelerated computing to accelerate the process of segmenting scene foreground and background in frames of streaming video. The resulting efficiency in processing pixel data on GPU 806 allows the server 800 to scale to support multiple camera-feeds using a smaller hardware footprint.

Illustratively, the memory 820 includes a video analytics component 822 and a current frame 824, previous frame 825, an object list for the current frame 826 and an object list 828 for the prior frame. Storage 830 includes a background model 832 and a background image 834. As discussed above, the video analytics component 822 may be configured to segment scene foreground from background in the current frame 824 to create a foreground mask for the current frame (e.g., a mask indicating whether each pixel is assigned as depicting foreground and background). Further still, the video analytics component 822 may update the background model 832, absorbing foreground pixels into the background model 832. The background image 834 provides a representation of a scene absent any foreground objects that may change over time (1) as elements of scene foreground are absorbed by the background model 832 and (2) as background illumination gradually changes. Doing so ensure that the video analytics component 822 can effectively and efficiently respond to changes in a scene, without overly increasing computational complexity.

Further, the video analytics component 822 may include a tracker component used to provide continuity to foreground objects detected in each frame of video. For example, the tracker component may be used to identify pixels which depict the same object from frame-to-frame, regardless of changes in perspective, e.g., when a car turns, changing the view of the car exposed to a camera from the front to side. Or when the shape of the foreground object changes, e.g., as when a person walking across a subway platform, picking up a package, opening up an umbrella (among countless other examples). In one embodiment, as described above, the tracker component may first determine a set of foreground objects using the mask generated by the BG/FG detector. Each object may correspond to a generally contiguous region of foreground pixels in the background image. However, the BG/FG detector may merge certain background objects that exhibit common behavior. The detector may generate a best-fit ellipse to contain the foreground pixels of each foreground object. Once generated, the ellipses in the current frame are matched to the ellipses generated in processing the previous frame (N−1) and any matching to foreground objects in the missing set. Importantly, tracking foreground objects by matching (at least initially) the size and orientation of ellipses generated for foreground in the current frame (N) and previous frame (N−1) avoids the need to build complex object models to track each new foreground object. Further, matching the size, position and orientation of the ellipses, rather than evaluating pixel color values directly to perform the initial matching, greatly reduces the computational requirements needed to track arbitrary objects depicted in a video stream.

Object list 828 is included to represent the missing set discussed above, as well as the known and discovered objects from the prior frame, ore more generally, the tracked objects being searched for in the current frame 824. Object list 826 is included to represent objects classified by the tracker of the video analytics component 822 as known or discovered (at least initially) in the current frame 824.

As described, in one embodiment, the geometric ellipse matching is used to determine set of known, discovered, and missing ellipses and foreground objects. Foreground objects assigned to known set are further evaluated using a weighted color distribution to confirm that the known ellipse depicts the same foreground object as the ellipse in the prior frame. Foreground objects assigned to discovered set are also evaluated using a weighted color distribution to confirm that the pixels in such foreground objects were not erroneously detected as depicting foreground, e.g., due to lighting or illumination changes. That is, if the pixel colors in a new foreground object match the colors in the background image, then the pixels of that new foreground object are reclassified as depicting background. Foreground objects in the prior frame assigned to the missing set are searched for in the current frame using a location particle filter (LOPART) with bounding ellipses defined (if needed) using a size and orientation particle filter (SOPART). If a foreground object cannot be identified in the current frame for a missing ellipse from the prior frame, then tracking is ended for that foreground object. That is, the trajectory for such a foreground object is considered complete.

Figure 9:
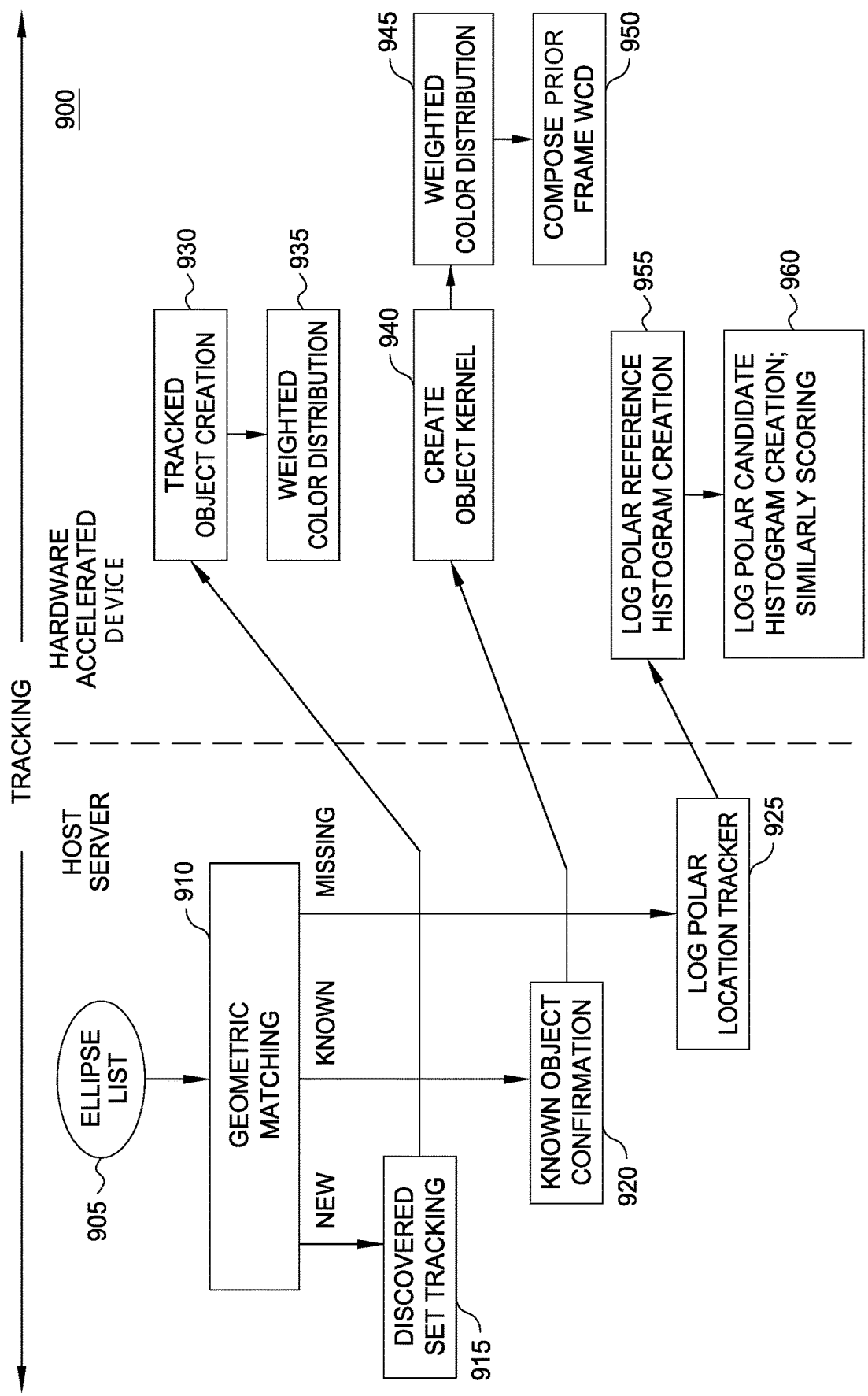
FIG. 9 illustrates a diagram showing components of the video analytics system executed on a host server and a hardware acceleration processor (e.g., a GPU), according to one embodiment of the disclosure.

Advantageously, embodiments of a detected object tracker for a video analytics system may be adapted to execute on both a server system computing processor, as well as on specialized hardware acceleration devices (e.g., a GPU). Further, embodiments presented herein can be scaled to process large numbers of camera feeds simultaneously. For example, FIG. 9 illustrates a diagram 900 showing components of the video analytics system executed on a host server and a hardware acceleration processor (e.g., a GPU), according to one embodiment of the disclosure. As shown, elements on the left side of diagram 900 are generally executed on a host server processor and elements of the right side may be executed in parallel on a hardware acceleration processor (e.g., a GPU). For example, the ellipse list 905 is evaluated using the geometric matching to build a new, known, and missing set of ellipses, processed by the discovered set tracking 915, known object confirmation 920, and log polar tracking components 925. In turn, the discovered set tracking 915, known object confirmation 920, and log polar tracking components 925 may be configured to export processing of the new, known, and missing ellipses to processing pipelines or threads of the hardware acceleration processor, allowing the ellipses and foreground object data for the known, discovered, and missing sets to be evaluated, in parallel, each frame.

For example, as shown, the discovered set tracking component 915 may use the GPU to perform tracked object creation process 930 (initializing a trajectory for each new object) and generate a weighted color distribution 935 from the foreground pixels within the ellipse bounding such foreground objects. The known object confirmation component 920 may use the GPU to match each ellipse depicting a previously tracked, or known, foreground object, identify the kernel parameters of the ellipse 940, i.e., a kernel function weight used to create a Gaussian distribution centered over the ellipse. The known object confirmation component 920 then generates a weighted color distribution 945 from the foreground pixels of the ellipse bounding the known object in the current frame (N) and preform the comparison 950 with the WCD of the tracked object generated in processing the corresponding ellipse of the prior frame. The log polar tracking component 925 may use the GPU to create the log polar reference histogram 955 and the log polar candidate histograms 960 using particles from the LOPART particle filter.

In the preceding, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, a reference to "the invention" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a virtual server instance in a computing cloud could be configured to execute the video analytics components to process a streaming camera feed (or feeds). In such case, the computing resources could be scaled as needed as multiple camera feeds are added.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for tracking foreground objects depicted in a video scene, the method comprising:
    receiving, via a processor, a background/foreground (BG/FG) segmentation of a current video frame from a plurality of video frames of the video scene, the current video frame including at least one appearance value for each of a plurality of pixels and wherein the BG/FG segmentation classifies at least one pixel in the plurality of the pixels as depicting at least one of scene foreground or scene background;
    for each region of pixels in the current video frame classified as depicting the video scene foreground, determining, via the processor, an ellipse to bound that region;
    attempting to match, via the processor, a geometry of a first ellipse from the ellipses with a geometry of a second ellipse associated with a prior frame from the plurality of video frames;
    in response to successfully matching the geometry of the first ellipse with the geometry of the second ellipse:
        classifying, via the processor, the first ellipse as a first known foreground object tracked in the prior frame;
        extending, via the processor, a trajectory of the first known foreground object based on the at least one appearance value of the pixels bound by the first ellipse to update at least one of size, orientation, and motion data of the first known foreground object; and
        tracking, via the processor, the first known foreground object based on the trajectory, and
    in response to not successfully matching the geometry of the first ellipse with the geometry of the second ellipse:
        assigning the first ellipse to a set of discovered ellipses; and
        assigning the second ellipse to a set of missing ellipses.

2. The method of claim 1, wherein classifying the first ellipse as corresponding to the first known foreground object comprises matching at least one of a size, orientation, and location of the first ellipse with the second ellipse, the second ellipse being generated for the first known foreground object tracked in the prior frame.

3. The method of claim 1, wherein classifying the first ellipse as corresponding to the first known foreground object further comprises:
    matching at least one of a size, orientation, and location of the first ellipse with the second ellipse, the second ellipse being generated for the first known foreground object tracked in at least the prior frame; and
    comparing a weighted color distribution (WCD) generated using the appearance values of pixels bound by the first ellipse with a WCD generated using appearance values of pixels bound by the second ellipse generated for the first known foreground object tracked in at least the prior frame.

4. The method of claim 1, wherein extending the trajectory of the first known foreground object comprises generating at least one of appearance data, position data, velocity data, and direction data.

5. The method of claim 1, further comprising, classifying a third ellipse as depicting a new foreground object within the video scene.

6. The method of claim 1, further comprising:
classifying a third ellipse as depicting a new foreground object within the video scene; and
initializing a trajectory for the new foreground object.

7. The method of claim 1, further comprising:
classifying a third ellipse as depicting a new foreground object within the video scene; and
upon determining a size and orientation of a geometry of the third ellipse matches a geometry of an ellipse in the set of missing ellipses:
reclassifying the third ellipse as corresponding to a second known foreground object; and
extending a trajectory of the second known foreground object based on the appearance values of the pixels bound by the third ellipse.

8. The method of claim 1, further comprising:
identifying an ellipse corresponding to a foreground object tracked in a prior frame, wherein the identified ellipse was not matched to any of the ellipses determined for the current video frame; and
adding the identified ellipse to the set of missing ellipses.

9. A non-transitory computer-readable storage medium containing a program, which when executed on a processor, performs an operation for tracking foreground objects depicted in a video scene, the operation comprising:
receiving a background/foreground (BG/FG) segmentation of a current video frame from a plurality of video frames of the video scene, the current video frame including at least one appearance value for each of a plurality of pixels and wherein the BG/FG segmentation classifies at least one pixel in the plurality of the pixels as depicting either scene foreground or scene background;
for each region of pixels in the current video frame classified as depicting the video scene foreground, determining an ellipse to bound that region;
attempting to match a geometry of a first ellipse from the ellipses with a geometry of a second ellipse associated with a prior frame from the plurality of video frames;
in response to successfully matching the geometry of the first ellipse with the geometry of the second ellipse:
classifying the first ellipse as a first known foreground object tracked in the prior frame;
extending a trajectory of the first known foreground object based on the at least one appearance value of the pixels bound by the first ellipse to update at least one of size, orientation, and motion data of the first known foreground object; and
tracking the first known foreground object based on the trajectory, and
in response to not successfully matching the geometry of the first ellipse with the geometry of the second ellipse:
assigning the first ellipse to a set of discovered ellipses; and
assigning the second ellipse to a set of missing ellipses.

10. The non-transitory computer-readable storage medium of claim 9, wherein classifying the first ellipse as corresponding to the first known foreground object comprises matching at least one of a size, orientation, and location of the first ellipse with the second ellipse, the second ellipse generated for the first known foreground object tracked in at least the prior frame.

11. The non-transitory computer-readable storage medium of claim 9, wherein classifying the first ellipse as corresponding to the first known foreground object comprises:
matching at least one of a size, orientation, and location of the first ellipse with the second ellipse, the second ellipse generated for the first known foreground object tracked in the prior frame; and
comparing a weighted color distribution (WCD) generated using the appearance values of pixels bound by the first ellipse with a WCD generated using appearance values of pixels bound by the second ellipse generated for the first known foreground object tracked in the prior frame.

12. The non-transitory computer-readable storage medium of claim 9, wherein extending the trajectory of the first known foreground object comprises generating at least one of appearance data, position data, velocity data, and direction data.

13. The non-transitory computer-readable storage medium of claim 9, wherein the operation further comprises, classifying a third ellipse as depicting a new foreground object within the video scene.

14. The non-transitory computer-readable storage medium of claim 9, wherein the operation further comprises:
classifying a third ellipse as depicting a new foreground object within the video scene; and
initializing a trajectory for the new foreground object.

15. The non-transitory computer-readable storage medium of claim 9, wherein the operation further comprises:
identifying an ellipse corresponding to a foreground object tracked in a prior frame, wherein the identified ellipse was not matched to any of the ellipses determined for the current video frame; and
adding the identified ellipse to the set of missing ellipses.

16. A system, comprising:
a video input source configured to provide a sequence of video frames, each depicting a video scene;
a central processing unit (CPU); and
a memory containing a program, which, when executed on the CPU is configured to perform an operation for tracking foreground objects depicted in the video scene, the operation comprising:
receiving a background/foreground (BG/FG) segmentation of a current video frame from a plurality of video frames of the video scene, wherein the current video frame includes at least one appearance value for each of a plurality of pixels and wherein the BG/FG segmentation classifies one or more of the pixels as depicting at least one of scene foreground or scene background,
for each region of pixels in the current frame classified as depicting the video scene foreground, determining an ellipse to bound that region,
attempting to match a geometry of a first ellipse from the ellipses with a geometry of a second ellipse associated with a prior frame from the plurality of video frames,
in response to successfully matching the geometry of the first ellipse with the geometry of the second ellipse:
classifying the first ellipse as corresponding to a first known foreground object tracked in the prior frame, extending a trajectory of the first known foreground object based on the at least one appearance value of the pixels bound by the first ellipse to update at least one of size, orientation, and motion data of the first known foreground object, and tracking the first known foreground object based on the trajectory, and in response to not successfully matching the geometry of the first ellipse with the geometry of the second ellipse:

assigning the first ellipse to a set of discovered ellipses; and assigning the second ellipse to a set of missing ellipses.

17. The system of claim 16, wherein classifying the first ellipse as corresponding to the first known foreground object comprises matching at least one of a size, orientation, and location of the first ellipse with the second ellipse, the second ellipse being generated for the first known foreground object tracked in at least the prior frame.

18. The system of claim 16, wherein:

classifying the first ellipse as corresponding to the first known foreground object comprises matching at least one of a size, orientation, and location of the first ellipse with the second ellipse, the second ellipse being generated for the first known foreground object tracked in at least the prior frame; and extending the trajectory of the first known foreground object comprises generating at least one of appearance data, position data, velocity data, and direction data.

19. The system of claim 16, wherein the operation further comprises, classifying at least a third ellipse as depicting a new foreground object within the video scene.

20. The system of claim 16, wherein the operation further comprises:

identifying an ellipse corresponding to a foreground object tracked in a prior frame, wherein the identified ellipse was not matched to any of the ellipses determined for the current video frame; and adding the identified ellipse to the set of missing ellipses.

* * * * *